(12) United States Patent
Dammermann et al.

(10) Patent No.: US 10,823,329 B1
(45) Date of Patent: Nov. 3, 2020

(54) CLAMP AND COMPUTING DEVICE STAND INCORPORATING SAME

(71) Applicant: 1514 Tech, LLC, Huntingdon Valley, PA (US)

(72) Inventors: Kurt Dammermann, Bryn Mawr, PA (US); Joshua Funamura, Philadelphia, PA (US); K. Carter James, Baltimore, MD (US); Michael Kalick, Ambler, PA (US); Stephen Bianco, Feasterville, PA (US); Ronald Trichon, Meadowbrook, PA (US)

(73) Assignee: 1514 TECH, LLC, Ambler, PA (US)

( * ) Notice: Subject to any disclaimer, the term of this patent is extended or adjusted under 35 U.S.C. 154(b) by 0 days.

(21) Appl. No.: 16/777,288

(22) Filed: Jan. 30, 2020

Related U.S. Application Data

(60) Provisional application No. 62/854,292, filed on May 29, 2019.

(51) Int. Cl.
*F16M 13/02* (2006.01)
*F16B 2/10* (2006.01)

(52) U.S. Cl.
CPC ............ *F16M 13/022* (2013.01); *F16B 2/10* (2013.01); *F16M 2200/06* (2013.01)

(58) Field of Classification Search
CPC ............ F16M 13/022; F16M 2200/06; F16M 2200/061; A47B 23/02; A47B 23/025; B25B 5/101; B25B 5/103; B25B 5/04; F16B 2/065; F16B 2/10; A61B 2090/571; A61B 90/57; A61G 13/101; B66F 7/065
See application file for complete search history.

(56) References Cited

U.S. PATENT DOCUMENTS

| | | | |
|---|---|---|---|
| 3,018,080 A * | 1/1962 | Loudon | E04B 9/006 248/228.4 |
| 4,535,962 A | 8/1985 | Chan et al. | |
| 5,016,852 A * | 5/1991 | Herendeen | A47B 23/02 248/447.2 |
| 5,535,973 A | 7/1996 | Bailey et al. | |
| 5,694,864 A * | 12/1997 | Langewellpott | B66F 7/0608 108/145 |
| 5,802,636 A | 9/1998 | Corbin et al. | |
| 5,971,378 A | 10/1999 | Sweeney | |
| 5,983,474 A * | 11/1999 | Koppe | B25B 27/023 29/261 |

(Continued)

*Primary Examiner* — Jonathan Liu
*Assistant Examiner* — Guang H Guan
(74) *Attorney, Agent, or Firm* — Panitch Schwarze Belisario & Nadel LLP

(57) ABSTRACT

A clamp includes first and second legs pivotally and crosswise attached to one another, with a closing mechanism connected to both legs. The closing mechanism includes an anchor body having a threaded bore engaged with a threaded screw. A distal end of the threaded screw engages a drive body. Two drive-body links each have a first end engaging the drive body and a second end engaging one of the first and second legs at link joints so that when the drive body is urged in a distal direction by the drive screw, the respective first ends and the respective second ends are urged together. The clamp may form part of a computing device stand with a base arm connected to the clamp, a main arm connected to the base arm, and a device-receiving attachment operatively connected to the main arm.

30 Claims, 31 Drawing Sheets

(56) References Cited

U.S. PATENT DOCUMENTS

| | | | | |
|---|---|---|---|---|
| 6,116,855 | A * | 9/2000 | Maki | F04C 5/00 |
| | | | | 29/264 |
| 6,860,454 | B1 * | 3/2005 | Gronowicz, Jr. | H02G 3/30 |
| | | | | 248/67.7 |
| 7,179,010 | B2 | 2/2007 | Weger et al. | |
| 7,637,405 | B2 | 12/2009 | Emmerling et al. | |
| 7,703,358 | B2 | 4/2010 | Ubinana Felix | |
| 8,051,515 | B1 | 11/2011 | Kring | |
| 8,544,161 | B2 * | 10/2013 | Carnevali | B60R 11/0241 |
| | | | | 29/450 |
| 8,621,692 | B1 | 1/2014 | Kring | |
| 8,622,359 | B2 * | 1/2014 | Carnevali | F16M 11/14 |
| | | | | 248/316.1 |
| 8,733,508 | B2 * | 5/2014 | Bacon | B66F 7/065 |
| | | | | 187/269 |
| 9,038,971 | B1 * | 5/2015 | Guthrie | F16M 11/40 |
| | | | | 248/121 |
| 9,133,982 | B1 * | 9/2015 | Valdez | F16M 11/10 |
| D764,478 | S * | 8/2016 | Radmard | H04B 1/3888 |
| | | | | D14/440 |
| 9,664,214 | B1 * | 5/2017 | Gupta | F16B 2/10 |
| RE46,876 | E * | 5/2018 | Garceau | B60P 3/077 |
| 9,975,497 | B2 * | 5/2018 | Kim | F16M 11/041 |
| 10,133,306 | B2 * | 11/2018 | Chiang | G06F 1/163 |
| 10,702,067 | B2 * | 7/2020 | Acevedo | A47C 1/11 |
| 2007/0252068 | A1 | 11/2007 | Secora | |

* cited by examiner

CLAMP AND COMPUTING DEVICE STAND INCORPORATING SAME

CROSS-REFERENCE TO RELATED APPLICATIONS

This application claims the benefit of priority under 35 USC § 119(e) of U.S. Provisional Patent Application No. 62/854,292 filed May 29, 2019, the contents of which are incorporated herein by reference.

BACKGROUND

The present disclosure relates generally to clamps and clamping devices. Certain embodiments of the disclosure relate more particularly to a stand for a device such as a laptop computer, a tablet computer, or other similar device having a viewing screen, with the stand including a clamp for engaging a frame of a bed or other furniture piece to support the device for convenient viewing or other use.

SUMMARY OF THE DISCLOSURE

Briefly stated, an example of a clamp for engaging a clamped object comprises a first leg having a first end, a second end, and a central portion between the first end and the second end. A first foot has a clamping surface and is attached to the first end of the first leg. A second foot has a clamping surface and is attached to the second end of the first leg. A second leg has a first end, a second end, and a central portion located between the first end and the second end. A first foot has a clamping surface and is attached to the first end of the second leg. A second foot has a clamping surface and is attached to the second end of the second leg. The first leg and the second leg are pivotally connected to each other about their central portions by a main shaft. The first leg and the second leg are connected in crosswise fashion such that the first end of the first leg and the first end of the second leg are located on a first side of a clamp dividing plane and the second end of the first leg and the second end of the second leg are located on a second side of the clamp dividing plane. A closing mechanism is connected to the first leg and the second leg. The closing mechanism comprises an anchor body having a threaded bore. The threaded bore is oriented transversely with respect to the main shaft. The anchor body is supported at a distance from the main shaft by a support frame. A threaded drive screw has a proximal end, an opposite distal end, and a drive-screw axis extending through the proximal and distal ends. The drive-screw axis is generally parallel to the clamp dividing plane. A drive body is located in a distal direction from the anchor body. The drive body is supported for axial movement along the drive-screw axis and has a drive-screw landing for receiving the distal end of the drive screw. A first drive-body link has a first end pivotally attached to the drive body and a second end pivotally attached to the first leg at a first link joint radially spaced from the main shaft. A second drive-body link has a first end pivotally attached to the drive body and a second end pivotally attached to the second leg at a second link joint radially spaced from the main shaft. The drive body urges the first and second drive-body links at least partially distally. The drive-body links urge the first ends and the second ends of the legs to pivot toward one another to provide a clamping action between the first ends and between the second ends of the first and second legs. Each clamping surface of each foot is offset from the main shaft. The clamping surfaces of the feet of the first ends and the feet of the second ends of the first and second legs may engage a clamped object which intersects the clamp dividing plane without the clamped object interfering with the main shaft or the first and second legs. The closing mechanism is configured so that upon a rotation of the drive screw in a first direction, the drive screw advances distally and reduces a distance between the distal end of the drive screw and the main shaft, thereby reducing a drive-body gap in which the drive body is movable between the distal end of the drive screw and the main shaft. The closing mechanism is configured so that upon a rotation of the drive screw in a second direction, the drive screw translates proximally with respect to the drive body and increases the distance between the distal end of the drive screw and the main shaft, thereby increasing the drive-body gap in which the drive body is movable between the distal end of the drive screw and the main shaft.

Any embodiment of the clamp may include a pair of spaced anchor plates pivotally connected with respect to the first and second legs and extending radially outwardly with respect to the main shaft. The drive body may be disposed between the first and second anchor legs in a distal direction from the anchor body. In certain embodiments, the anchor plates are pivotally connected directly to the main shaft.

Any embodiment of the clamp may include a drive knob non-rotatably secured to the proximal end of the drive screw. In certain embodiments the anchor body may have a proximal portion with a knob bore telescopically engaging the drive knob. In certain embodiments, the drive knob may comprise a drive-knob nut non-rotatably secured to the proximal end of the drive screw and a drive-knob body with an internal socket non-rotatably engaging the drive-knob nut.

Any embodiment of the clamp may include a drive body comprising a pair of opposing rails externally engaging a pair of opposite surfaces of at least one of the anchor plates, with the opposite surfaces of at least one of the anchor plates extending in a direction parallel to the drive-screw axis.

Any embodiment of the clamp may further comprise a drive-body pin extending at least partially parallel to the main shaft and pivotally engaging both the first end of the first drive-body link and the first end of the second drive-body link. In certain embodiments, at least one anchor plate may include an internal pin track extending parallel to the drive screw axis and engaging a side surface of the drive-body pin.

Any embodiment of the clamp may comprise a biasing member biasing the first and second legs to urge the first ends toward one another and the second ends toward one another.

In any embodiment of the clamp, at least one foot may comprise a foot assembly operatively secured in a foot mount in one of the first end of the first leg, the first end of the second leg, the second end of the first leg, and the second end of the second leg. The foot assembly may comprise a foot-assembly base having a base end and a free end and a longitudinal axis defining a base direction and an opposite free direction. The base end may be formed by a knob having a bore with internal threads and an opening at a free-direction end thereof. The knob may have a radially outwardly extending external flange. The flange may be operatively secured in the foot mount so that the knob is rotatable and axially constrained with respect to the mounting hole. An extension may extend along an extension axis and includes the clamping surface of the foot. The clamping surface may be parallel to the extension axis. The extension may have an extension base end and an extension free end.

The extension base end may have a projection for engaging the internal threads of the knob such that rotation of the knob in a first direction causes the extension to extend with respect to the knob, and rotation of the knob in a second direction causes the extension to retract with respect to the knob. In certain embodiments, the extension may have a gripping surface disposed non-colinearly with respect to the extension axis. In certain embodiments, the clamping surface may have a clamping pad attached thereto.

In certain embodiments, the foot assembly may comprise an orienting collar having a disc with a slot extending longitudinally therethrough and an outer circumferential edge having at least one of a radially outwardly extending protrusion and a radially inwardly extending recess. A longitudinal protrusion may extend from the disc in the base direction and may be configured to engage the extension to prevent the extension from pivoting relative to the orienting collar. The foot mount may comprise a foot-mounting hole having at least one of a radially outwardly extending recess and a radially inwardly extending protrusion. Each such radially outwardly extending recess of the foot mount may be sized to allow for constrained movement of the radially outwardly extending protrusion of the foot mount within the corresponding radially inwardly extending recess of the circumferential edge of the disc. Each such radially inwardly extending protrusion of the foot mount may be sized for constrained movement of the radially inwardly extending protrusion of the foot mount within the corresponding radially inwardly extending indentation of circumferential edge of the disc, thus providing for constrained pivoting of the orienting collar and the extension with respect to the foot-mounting hole.

In certain embodiments, the foot assembly may comprise an orienting collar having a disc with a slot extending longitudinally therethrough and a flange extending radially outwardly from an outer circumferential edge of the disc, with the flange having a circumferential gap therein. A pair of longitudinal protrusions may extend from the disc in the base direction on opposite sides of the slot and may be configured to engage the extension to prevent the extension from pivoting relative to the orienting collar. The foot mount may comprise a foot-mounting hole having at least one of a radially outwardly extending recess and a radially inwardly extending protrusion. The radially outwardly extending recess and the radially inwardly extending protrusion may be sized to allow for constrained movement of the radially outwardly extending protrusion of the disc within the corresponding radially outwardly extending recess of the foot-mounting hole and for constrained movement of the radially inwardly extending protrusion of the foot mount within the corresponding radially inwardly extending indentation of the disc, thus providing for constrained pivoting of the orienting collar and the extension with respect to the foot-mounting hole.

In certain embodiments, the foot assembly may comprise an orienting collar having a disc with a slot extending longitudinally therethrough and a radially outwardly extending protrusion extending from an outer circumferential edge of the disc. A longitudinal protrusion may extend from the disc in the base direction on opposite sides of the slot and may be configured to engage the extension to prevent the extension from pivoting relative to the orienting collar. The foot mount may comprise a foot-mounting hole having a radially outwardly extending recess configured to accommodate the radially outwardly extending protrusion of the disc of the orienting collar. The recess may be sized to allow for constrained movement of the radially outwardly extending protrusion therein, thus providing for constrained pivoting of the orienting collar and the extension with respect to the foot-mounting hole.

In another aspect, an example of a computing device stand comprises a clamp for engaging a support member. A base arm has a first base-arm portion connected to the clamp and an opposing second base-arm portion. A main arm with a first main-arm portion is connected to the second base-arm portion, and an opposing second main-arm portion. A device-receiving attachment is operatively connected to the second main-arm portion. The clamp comprises a first leg having a first end, a second end, and a central portion between the first end and the second end. A first foot has a clamping surface and is attached to the first end of the first leg. A second foot has a clamping surface and is attached to the second end of the first leg. A second leg has a first end, a second end, and a central portion located between the first end and the second end. A first foot has a clamping surface and is attached to the first end of the second leg. A second foot has a clamping surface and is attached to the second end of the second leg. The first leg and the second leg are pivotally connected to each other about their central portions by a main shaft. The first leg and the second leg are connected in crosswise fashion such that the first end of the first leg and the first end of the second leg are located on a first side of a clamp dividing plane, and the second end of the first leg and the second end of the second leg are located on a second side of the clamp dividing plane. A closing mechanism is connected to the first leg and the second leg. The closing mechanism comprises an anchor body having a threaded bore. The threaded bore is oriented perpendicularly with respect to the main shaft. The anchor body is supported at a distance from the main shaft by a support frame. A threaded drive screw has a proximal end, an opposite distal end, and a drive-screw axis extending through the proximal and distal ends. The drive-screw axis is generally parallel to the clamp dividing plane. A drive body is located in a distal direction from the anchor body. The drive body is supported for axial movement along the drive-screw axis and has a drive-screw landing for receiving the distal end of the drive screw. A first drive-body link has a first end pivotally attached to the drive body and a second end pivotally attached to the first leg at a first link joint radially spaced from the main shaft. A second drive-body link has a first end pivotally attached to the drive body and a second end pivotally attached to the second leg at a second link joint radially spaced from the main shaft. The drive body urges the first and second drive-body links at least partially distally. The drive-body links urge the first ends and the second ends of the legs to pivot toward one another to provide a clamping action between the first ends and between the second ends of the first and second legs. Each clamping surface of each foot is offset from the main shaft. The clamping surfaces of the feet of the first ends and the feet of the second ends of the first and second legs may engage a clamped object which intersects the clamp dividing plane without the clamped object interfering with the main shaft or the first and second legs. The closing mechanism is configured so that upon a rotation of the drive screw in a first direction, the drive screw advances distally and reduces a distance between the distal end of the drive screw and the main shaft, reducing a drive-body gap in which the drive body is movable between the distal end of the drive screw and the main shaft. The closing mechanism is configured so that upon a rotation of the drive screw in a second direction, the drive screw translates proximally with respect to the drive body and increases the distance between the distal end of the drive screw and the main shaft, increasing the drive-body gap in which the drive body is movable between the distal end of the drive screw and the main shaft.

In any embodiment of the computing device stand, the lower base-arm portion may be oriented at least partially parallel to the drive-screw axis. In any embodiment of the computing device stand, at least one foot may comprise a foot assembly operatively secured in a foot mount in one of the first end of the first leg, the first end of the second leg, the second end of the first leg, and the second end of the second leg. The foot assembly may comprise a foot-assembly base having a base end and a free end and a longitudinal axis defining a base direction and an opposite free direction. The base end may be formed by a knob having a bore with internal threads and an opening at a free-direction end thereof. The knob may have a radially outwardly extending external flange, the flange being operatively secured in the foot mount so that the knob is rotatable and axially constrained with respect to the mounting hole. An extension may extend along an extension axis and includes the clamping surface of the foot. The clamping surface may be parallel to the extension axis. The extension may have an extension base end and an extension free end. The extension base end may have a projection for engaging the internal threads of the knob such that rotation of the knob in a first direction causes the extension to extend with respect to the knob, and rotation of the knob in a second direction causes the extension to retract with respect to the knob.

In any embodiment of the computing device stand, the base arm may comprise a first telescoping body and a second telescoping body telescopically and securably received with respect to the first telescoping body to provide a length adjustment of the base arm. In certain embodiments, the main arm may comprise a first main-arm end portion mounted for rotation with the second telescoping body with respect to the first telescoping body.

In any embodiment of the computing device stand, the main arm may comprise a first main-arm end member, a second main-arm end member, an upper main-arm member, and a lower main-arm member, wherein the first main-arm end member, the second main-arm end member, the upper main-arm member, and the lower main-arm member form a four-bar linkage movable with respect to the first main-arm end member in a vertical plane while maintaining an orientation of the second main-arm member with respect to vertical. In certain embodiments, the four-bar linkage may be selectively lockable to prevent movement thereof.

In any embodiment of the computing device stand, the device-receiving attachment may have a device-support surface and a principal device-support axis parallel thereto, and the device-receiving attachment may be operatively connected to the second main-arm portion and may be rotatable with respect to the second main-arm portion for a pitch adjustment of the device-receiving attachment about the principal device-support axis.

In any embodiment of the computing device stand, the device-receiving attachment may have a device-support surface, a principal device-support axis parallel thereto, and a transverse device-support axis oriented transversely with respect to both the principal device-support axis and the device-support surface. The device-receiving attachment may be operatively connected to the second main-arm portion and may be rotatable with respect to the second main-arm portion for a yaw adjustment of the device-receiving attachment about the transverse device-support axis. In certain embodiments, the device-receiving attachment may be operatively connected to the second main-arm portion by a friction hinge.

In any embodiment of the computing device stand, the device-receiving attachment may have a device-support surface, a first rail transverse to the device-support surface, and a second rail transverse to the device-support surface, the second rail being slidably and securably attached with respect to the first rail. In certain embodiments, the first rail may have a first device-contact surface and the second rail may have a facing second device-contact surface. The device-support surface may comprise a tab positionable in a support position in which a tab-device support surface of the tab faces one of the first device-contact surface and the second device-contact surface for securing a device between the tab-device support surface and one of the first device-contact surface and the second device-contact surface, and a non-support position in which the tab does not protrude from the device-support surface sufficiently to interfere with securing a device between the first device-contact surface and the second device-contact surface.

In any embodiment of the computing device stand, the main arm may be rotatable about the base arm to a stowed main-arm position in which the base arm extends from the clamp in a first direction, the main arm extends from the base arm in a second direction, and the second direction is generally opposite the first direction.

BRIEF DESCRIPTION OF THE SEVERAL VIEWS OF THE DRAWINGS

The foregoing summary, as well as the following detailed description of examples of systems and devices according to the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown. In the drawings.

DETAILED DESCRIPTION

Figure 1:
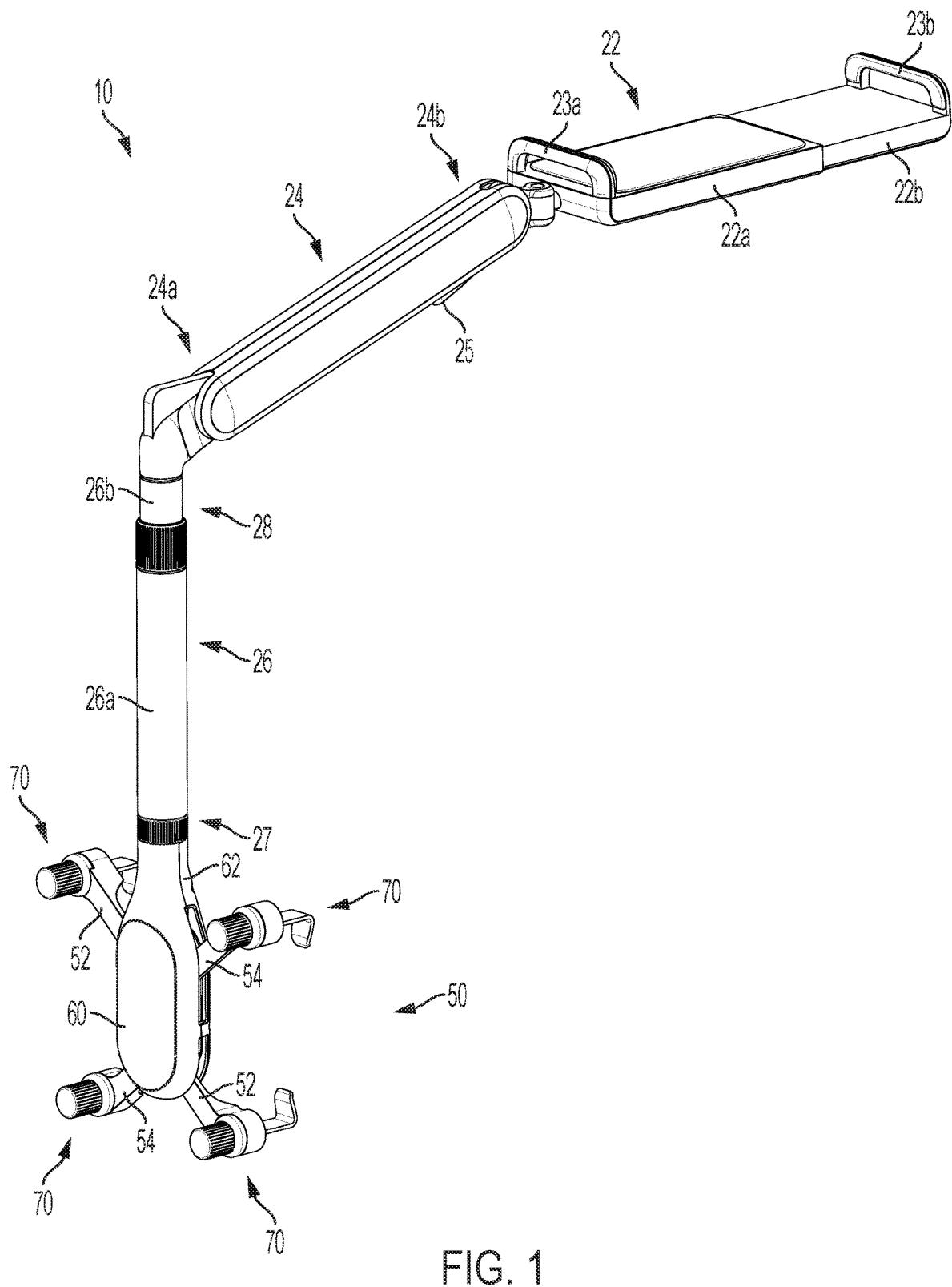
FIG. 1 is a front right perspective view of a computing device stand according to an embodiment of the invention.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of the device and designated parts thereof. Unless specifically set forth herein, the terms "a," "an," and "the" are not limited to one element but instead should be read as meaning "at least one." "At least one" may occasionally be used for clarity or readability, but such use does not change the interpretation of "a," "an," and "the." The terminology includes the words noted above, derivatives thereof and words of similar import. Moreover, the singular includes the plural, and vice versa, unless the context clearly indicates otherwise. Various components are described in terms of a single component; however, the illustrated embodiment, or other embodiments not illustrated, may include two or more of the same component, as illustrated in the drawings or noted in the specification, or as otherwise would be understood by a person of skill in the art. Various components may be described as being secured against movement, relative movement, or flexing; these references do not contemplate the absolute elimination of all movement or flexing. Instead, these references include restriction or movement of flexing sufficient to alter the functionality of the component or components in operative relation therewith. References to a component extending, moving, or flexing in a particular direction refer to the component extending, moving, or flexing at least partially in the particular direction (including a direction described as parallel to another direction axis, or component); an extension, movement, or flexion that includes any component of movement in the particular direction is included. Also, a "computing device stand" according to certain embodiments of the invention may be used to support a device having a viewing screen or panel for convenient viewing and/or other use. Therefore, unless otherwise indicated, a discussion of the computing device stand includes such a stand that may be used for supporting a laptop computer, a tablet computer, or another similar viewing screen or device. A first component "attached to" a second component may be a separate body attached to the second component or may be integrally formed therewith.

Figure 2:
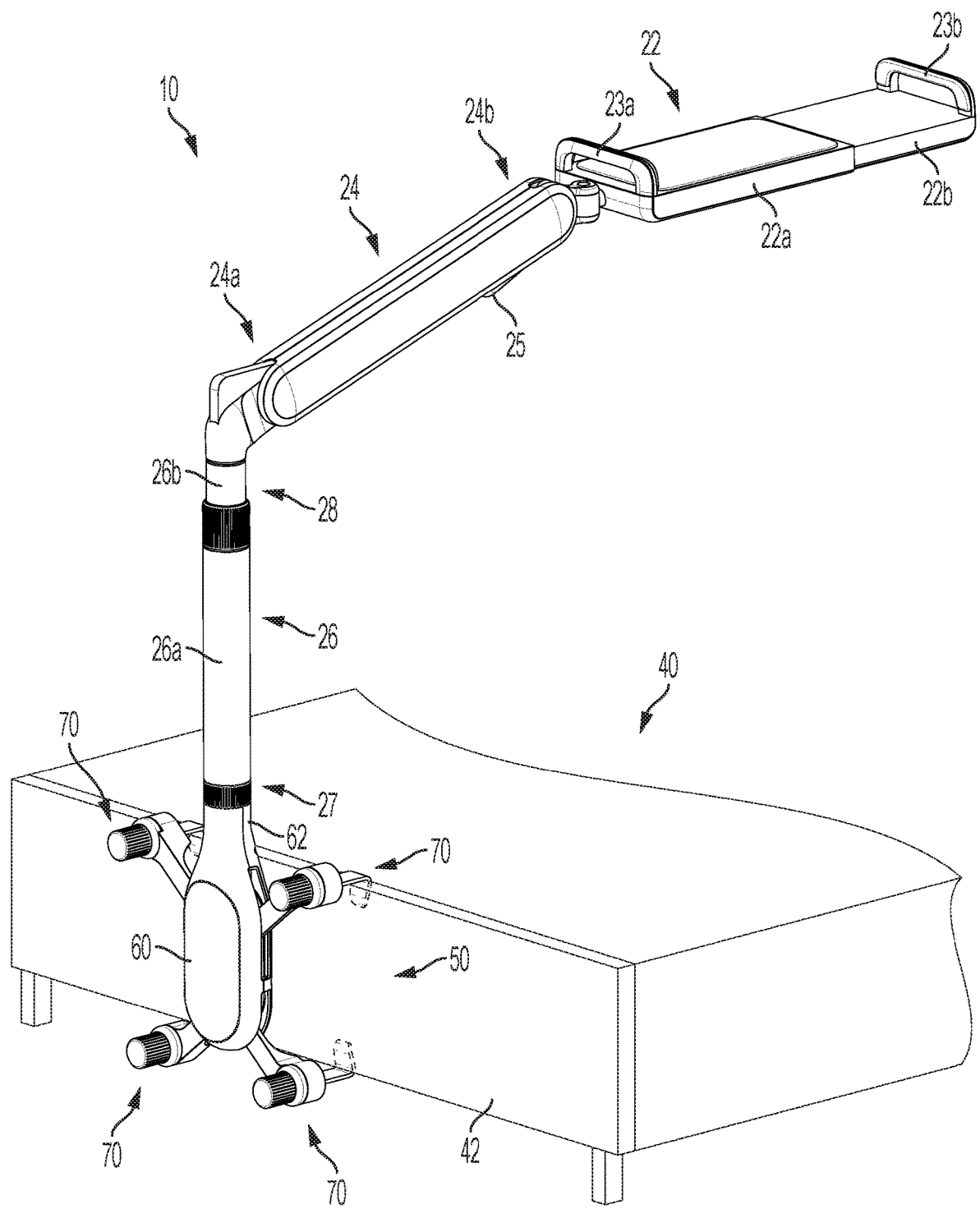
FIG. 2 is a front right partial perspective view of the computing device stand of FIG. 1 showing a clamp thereof attached to a frame rail of a bed.
Figure 3:
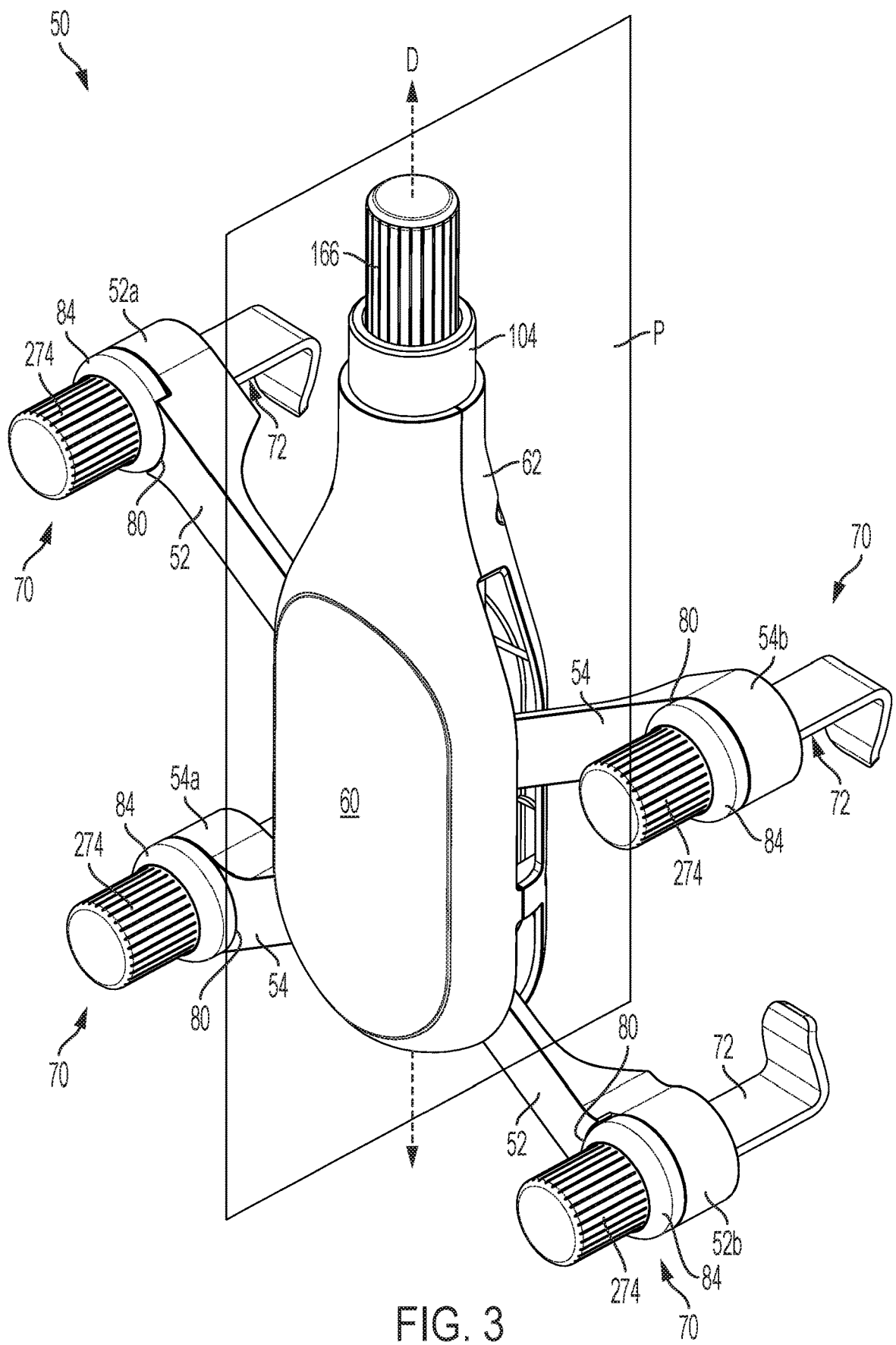
FIG. 3 is a front right perspective view of the clamp of the computing device stand of FIG. 1.

In one aspect, referring to FIGS. 1 and 2, a computing device stand 10 may include a clamp 50 for engaging a support member, which may be a frame rail 42 of a bed 40, or another structural member such as beam or plate, a counter, or any other body capable of supporting the computing device stand 10. The computing device stand 10 may include a base arm 26 having a first base-arm portion 27 connected to the clamp 50 and an opposing second base-arm portion 28. The base arm 26 may comprise a first telescoping body in the form of a first tube 26a and a second telescoping body telescopically in the form of a second tube 26b, which may be securely received with respect to the first telescoping body 26a to provide a length adjustment of the base arm 26. A main arm 24 may have a first main-arm portion 24a connected to the second base-arm portion 28, and an opposing second main-arm portion 24b. The first main-arm 24a may be mounted for rotation together with the second tube 26b, with respect to the first tube 26a. This configuration allows the main arm 24 to rotate in a swinging fashion about the clamp 50 to provide flexibility in positioning the main arm 24.

A device-receiving attachment 22 may be operatively connected to the second main-arm portion 24b, and the connection may be made by one or more of a pitch-control link and a yaw-control link. The pitch-control and/or yaw-control control links may allow the device-receiving attachment 22 to connect to or be adjusted with respect to the second main-arm portion 24b in a variety of orientations for convenient use.

The device-receiving attachment 22 may have a first rail 23a and an oppositely located second rail 23b for securing a device (not shown in FIGS. 1-2). The first rail 23a and the second rail 23b may be located on two slidably or telescopically connected sleeve members 22a, 22b, which may be configured to provide a range of movement between the first rail 23a and the second rail 23b. A lock 22e may secure the sleeve members 22a, 22b with respect to one another and may be actuated to release the sleeve members 22a, 22b for relative movement therebetween.

In certain embodiments of the device-receiving attachment, such as the device-receiving attachment 22' of FIGS. 29-31 and 35, a pop-up tab 22c may be provided to allow the device-receiving attachment to secure devices that are too small to be secured between the first rail 23a and the second rail 23b in the desired orientation (e.g., a small smartphone or the like). The first rail 23a may have at least one first device-contact surface 23aa, and the second rail 23b may have an oppositely facing second device-contact surfaces 23bb. A device-support surface 22f, with respect to which the first and second rails 23a, 23b are generally oriented transversely, may comprise the pop-up tab 22c positionable in a support position in which a tab-device support surface 22cc of the pop-up tab 22c faces one of the first device-contact surface 23aa and the second device-contact surface 23bb for securing a device between the tab-device support surface 22cc and one of the first device-contact surface 23aa and the second device-contact surface 23bb, and a non-support position in which the pop-up tab 22c may fit into a tab recess 22d within the device-support surface 22f, so as not to protrude from the device-support 22f surface sufficiently to interfere with securing a device between the first device-contact surface 23aa and the second device-contact surface 23bb. In the non-support position of the pop-up tab 22c, the tab-device support surface 22cc of the pop-up tab 22c may be rotated an angle with respect to the device-support position. In the device-receiving attachment 22', the pop-up tab 22c is rotatable to align with and fit within the tab recess 22d.

The device-receiving attachment 22, 22' may be mounted to provide a pitch adjustment of the device-support surface 22f. For example, referring to FIGS. 32-33, the device-receiving attachment 22' may provide a pitch adjustment by an internal mechanism as described below.

Referring again to FIGS. 1 and 2, the first base-arm portion 27 may be tubular and oriented parallel or generally parallel to the drive-screw axis D, which is described below. The main arm 24 is pivotable with respect to the base arm 27 about at least two axes, and preferably about generally vertical and generally horizontal axes, so that when the clamp 50 is secured to a support member or other object, the main arm may be pivoted to place the device-receiving attachment 22, and any device carried thereby, in a desired location. The main arm 24 may be normally locked against rotation and may be releasable by operation of a trigger 25, which may be connected to an internal mechanism of the main arm 24; examples of which are described further below. The main arm 24 may preferably be generally upwardly biased, via a gas cylinder, spring, or other biasing means (not shown), to control the rate of descent of the main arm 24 upon depression of the trigger 25 and resulting unlocking of the main arm 24. Examples of mechanisms for the main arm 24 are discussed below with respect to FIGS. 36-38.

The clamp 50 disclosed herein (including variations thereof) may be used as part of the disclosed computing device stand 10 and may be used separately from the computing device stand 10 in any application (including alternative computing device stands) to which a clamp for gripping a support member or engaging a clamped object may be suited, and in which the operating characteristics of the claim 50 may be sufficient.

Figure 4:
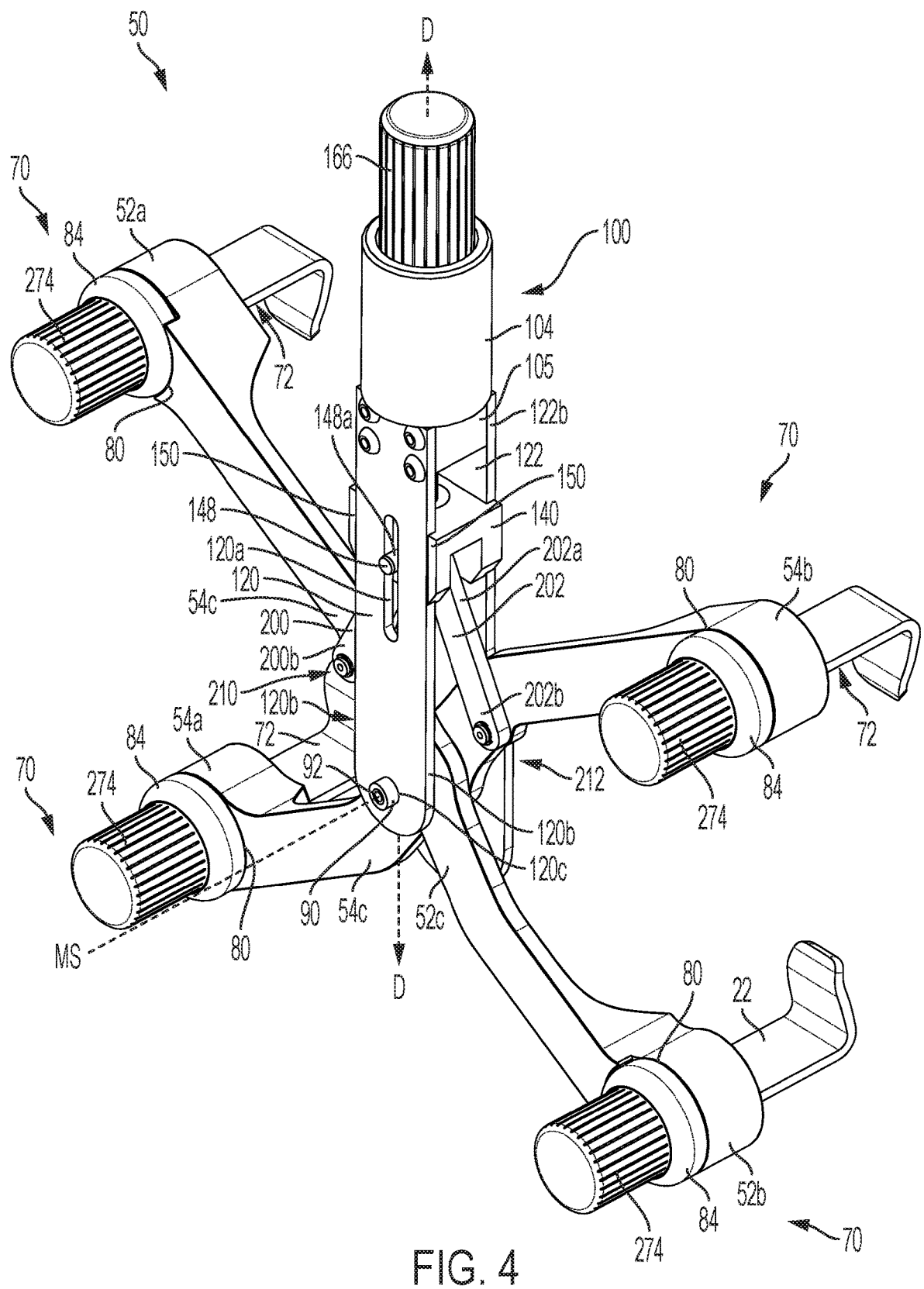
FIG. 4 is a front right perspective view of the clamp of FIG. 3, with external body shell members omitted to allow a view of portions of the clamp located therein.
Figure 5:
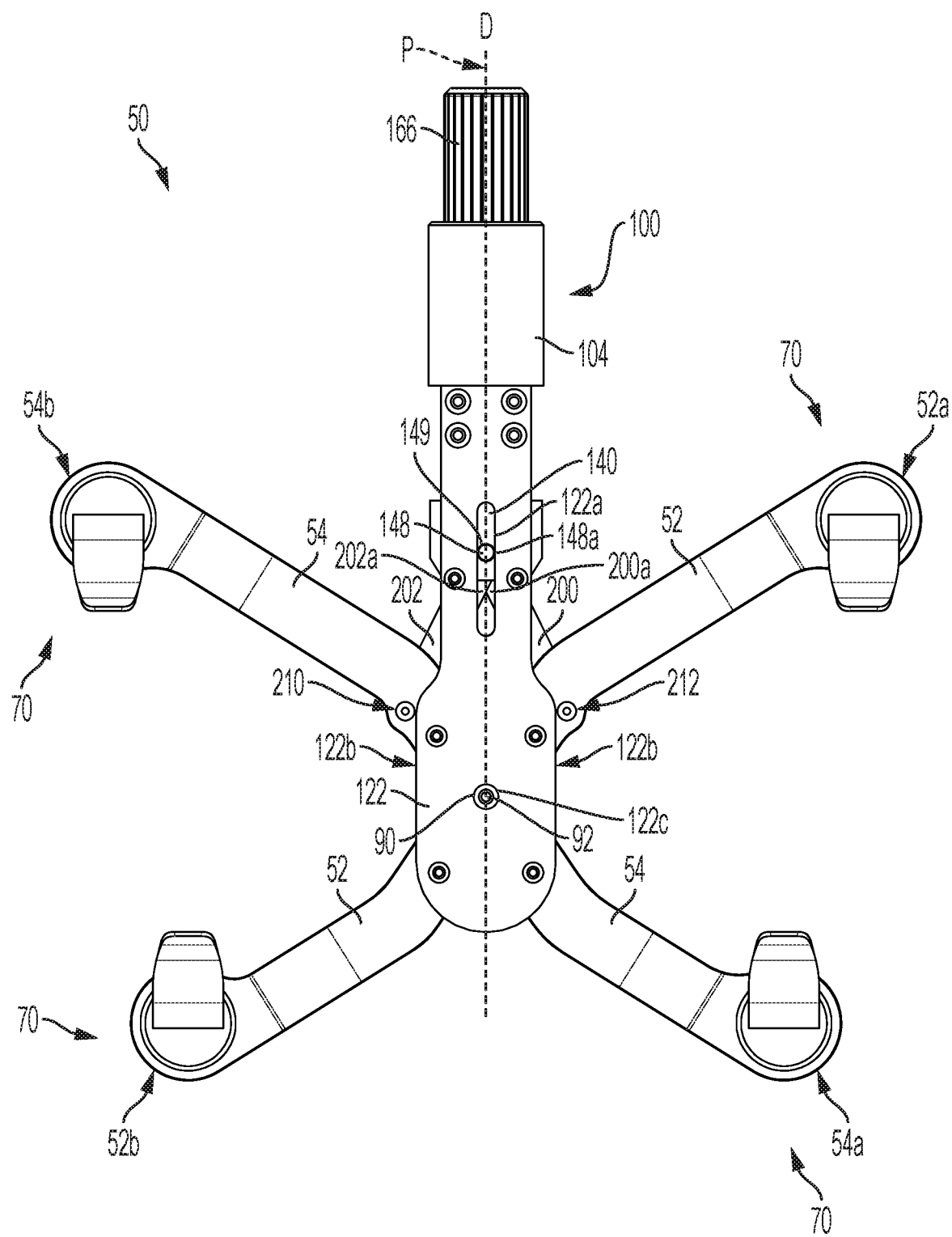
FIG. 5 is a rear elevational view of the clamp of FIG. 3, with external body shell members omitted to allow a view of portions of the clamp located therein.
Figure 6:
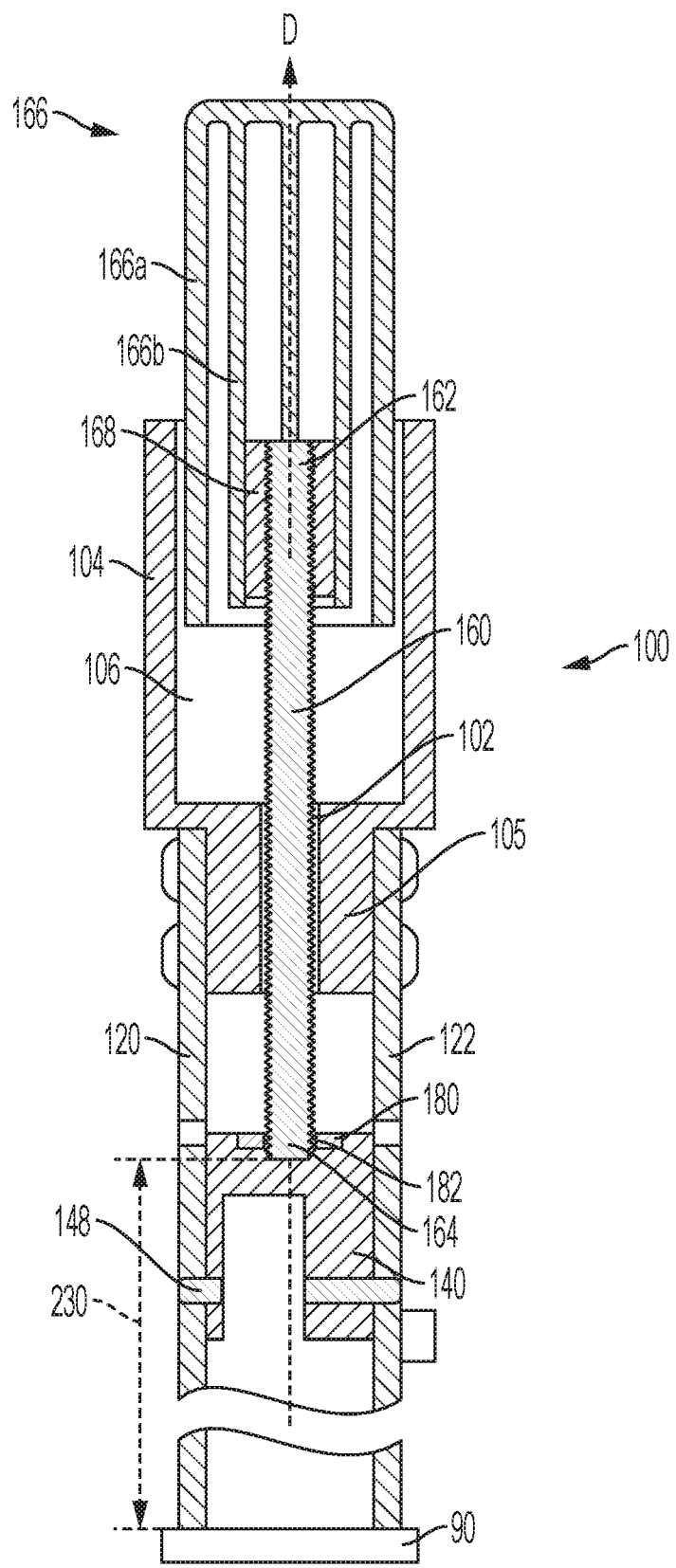
FIG. 6 is an enlarged partial sectional view of the clamp of FIG. 3, including a drive knob, drive shaft, anchor body, and drive body thereof.
Figure 7:
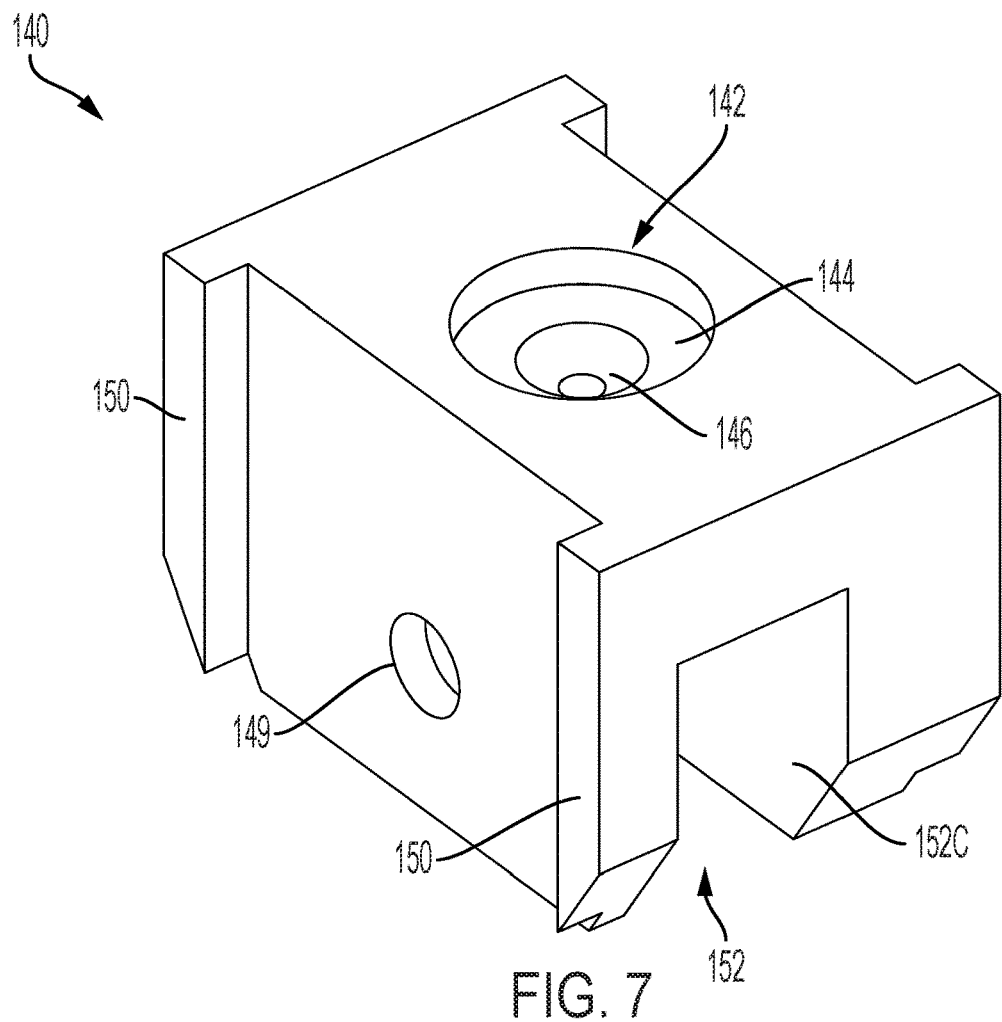
FIG. 7 is a front right perspective view of the drive body of the clamp of FIG. 3.
Figure 8:
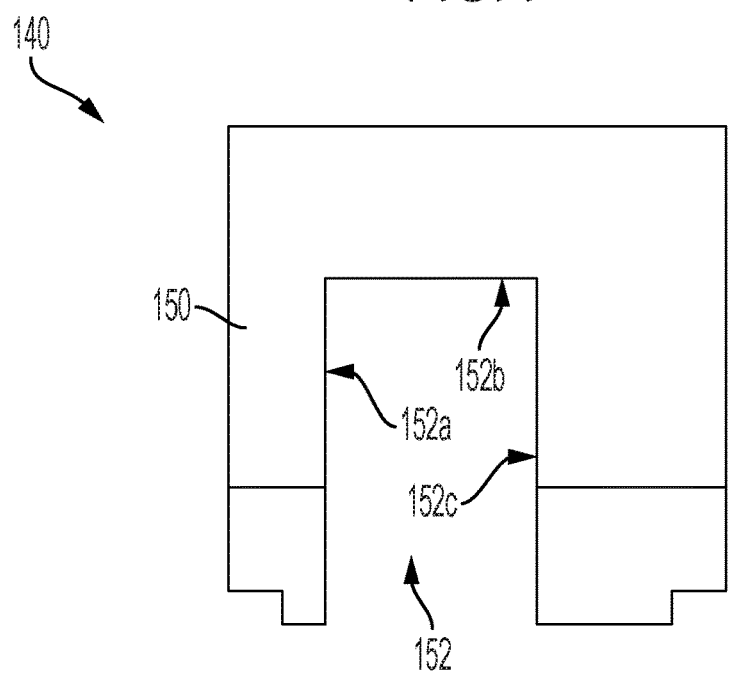
FIG. 8 is a right side elevational view of the drive body of FIG. 7.
Figure 9:
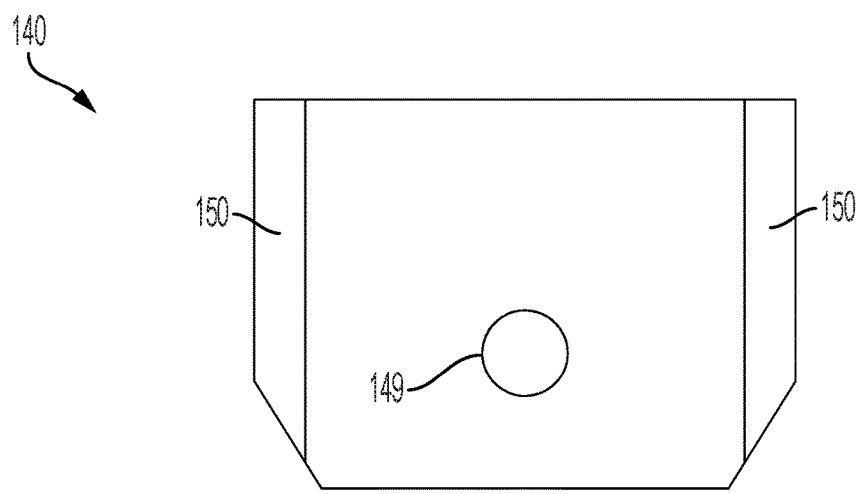
FIG. 9 is a rear elevational view (with respect to FIG. 1) of the drive body of FIG. 7.
Figure 10:
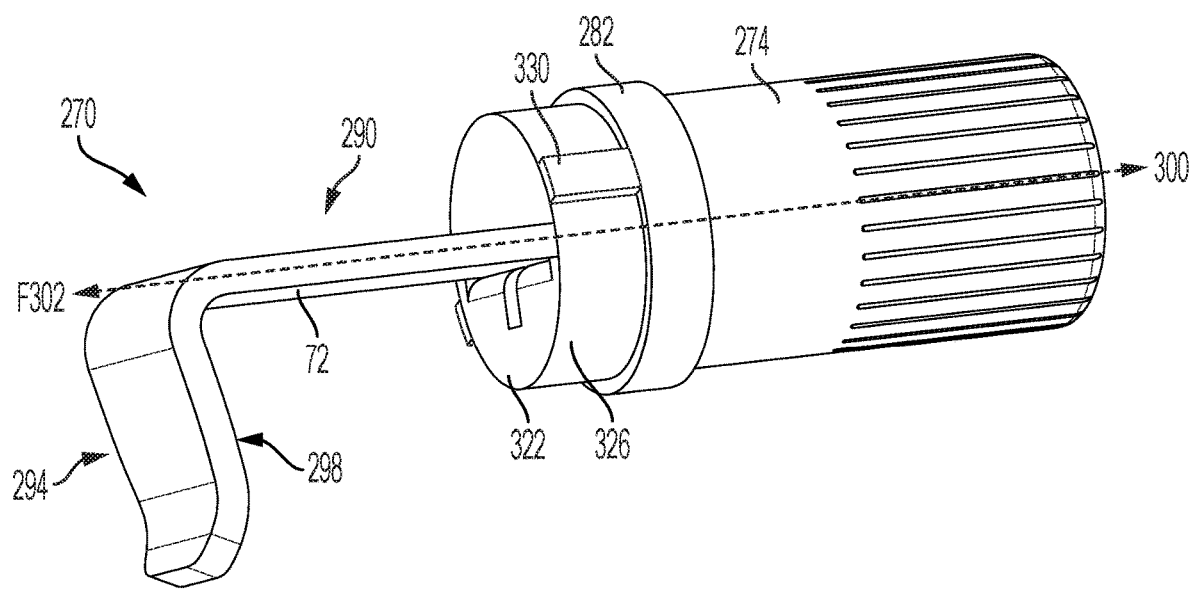
FIG. 10 is a left rear perspective view (with respect to FIG. 1) of a foot assembly of the clamp of FIG. 3.
Figure 11:
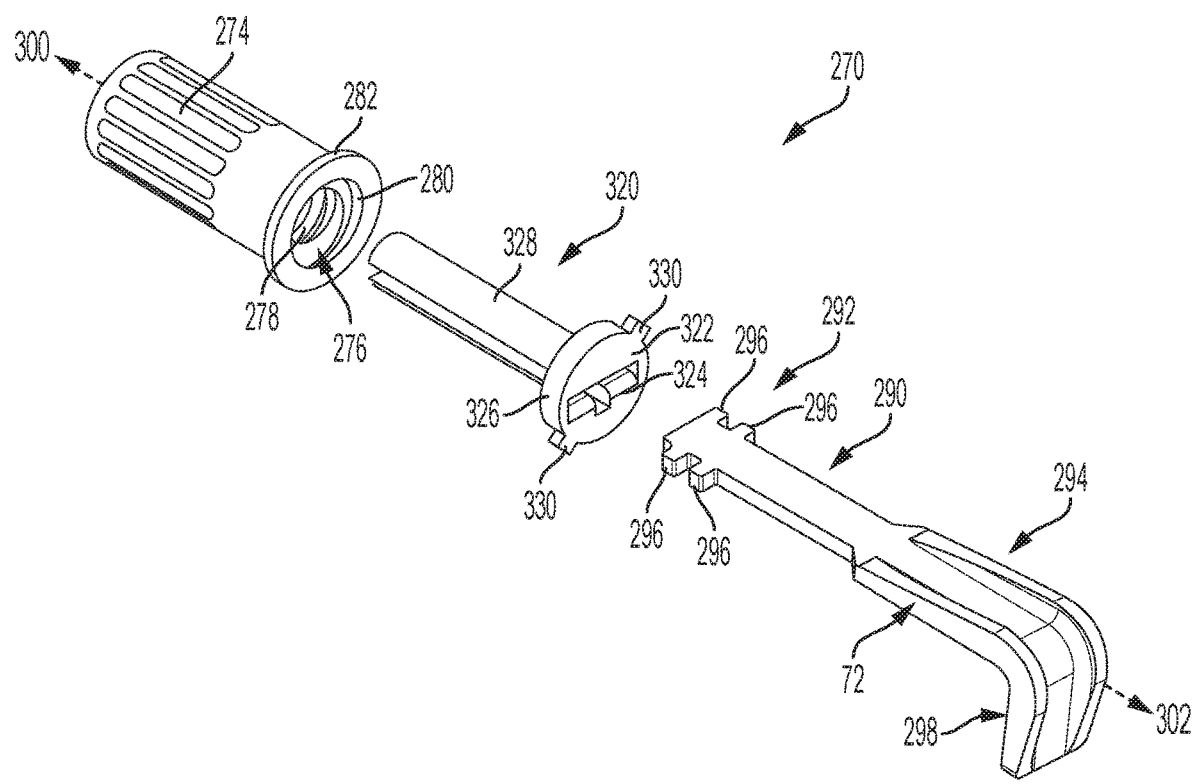
FIG. 11 is a right rear upper perspective exploded view (with respect to FIG. 1) of the foot assembly of FIG. 10.

Referring generally to FIGS. 3-6, the clamp 50 may include mating exterior body shell members 60, 62, which are omitted in FIGS. 4-6 to allow a view of internal components of the clamp 50. The clamp 50 includes a first leg 52 having a first end 52a, a second end 52b, and a central portion 52c between the first end 52a and the second end 52b. A foot 70 having a clamping surface 72 may be attached to the first end 52a of the first leg 52, and a foot 70 having a clamping surface 72 may be attached to the second end 52b of the first leg 52. A second leg 54 may be included and may have a first end 54a, a second end 54b, and a central portion 54c located between the first end 54a and the second end 54b. A foot 70 having a clamping surface 72 may be attached to the first end 54a of the second leg 54, and a foot 70 having a clamping surface 72 may be attached to the second end 54b of the second leg 54. The first leg 52 and the second leg 54 may be pivotally connected to each other about their central portions 52c, 54c by a main shaft 90, which may be cylindrical, or tubular, or both. The first leg 52 and the second leg 54 may be connected in crosswise fashion such that the first end 52a of the first leg 52 and the first end 54a of the second leg 54 may be located on a first side of a clamp dividing plane P (FIGS. 3, 5) and the second end 52b of the first leg 52 and the second end 54b of the second leg 54 are located on a second side of the clamp dividing plane P, which appears as a line in FIG. 5 due to the clamp dividing plane P being viewed edgewise in FIG. 5.

Each clamping surface 72 of each foot 70 may be offset from the main shaft 90, for example, in a direction parallel to a main-shaft axis MS of the main shaft 90 such that the clamping surfaces 72 of the feet 70 of the first ends 52a, 54a and clamping surfaces 72 of the feet 70 of the second ends 52b, 54b of the first and second legs 52, 54 may engage a clamped object, including a bed rail 42 or other support surface suitable for a computing device stand, which intersects the clamp dividing plane P without the clamped object interfering with the main shaft 90 or the first and second legs 52, 54. In certain embodiments, each clamping surface 72 of each foot 70 may be offset from the main shaft 90, and such offset may be in a direction generally parallel to a main-shaft axis MS of the main shaft 90, such that the clamping surfaces 72 of the feet 70 of the first ends 52a, 54a and clamping surfaces 72 of the feet 70 of the second ends 52b, 54b of the first and second legs 52, 54 may engage, and may in some embodiments simultaneously engage, a clamped object, which may include a straight or generally linear object. In certain embodiments, the offset may enable the clamping surfaces 72 to engage the clamped including a bed rail 42 or other support surface suitable for a computing device stand, which intersects the clamp dividing plane P without the clamped object interfering with the main shaft 90 or the first and second legs 52, 54. The main-shaft axis MS preferably lies within, or is at least parallel to, the clamp dividing plane P.

Referring to FIGS. 3-9, a closing mechanism may be connected to the first leg 52 and the second leg 54 and may be utilized in connection with relative pivoting motion of the first leg 52 and the second leg 54. The closing mechanism may include an anchor body 100 (FIG. 6) having a threaded bore 102. The anchor body 100 may have a proximal portion 104 and a distal portion 105, with the threaded bore 102 preferably being located within the distal portion 105. The threaded bore 102 may be oriented transversely and, further preferably, perpendicularly (as shown) with respect to the main shaft 90. The anchor body 100 may be supported at a distance from the main shaft 90 by a support frame. The support frame may include a pair of spaced anchor plates 120, 122, which may be pivotally connected with respect to the first and second legs 52, 54. The anchor plates 120, 122 may be fixed in spaced relation and, as shown, further preferably parallel relation, to opposite sides of the anchor body 100, thus forming a generally U-shaped body serving as a support frame. Each anchor plate 120, 122 has a mounting hole 120c, 122c aligned with the mounting hole 122c, 120c of the other anchor plate 122, 120. The mounting holes 120c, 122c may be axially aligned with the shaft 90 so that a common fastener such as a screw 92 or the like may pass through both mounting holes 120c, 122c as well as through the shaft 90 and holes in the central portions 52c, 54c of the first and second legs 52, 54. Alternatively, the support frame may include a single plate, or one or more plates, rods, bars, or other members configured to provide sufficient structural support to allow the anchor body 100 and a drive body 140 to function as described below. The anchor plates 120, 122 may extend radially outwardly with respect to the main shaft 90 and may be pivotally connected directly to the main shaft 90, noted above and as shown.

The closing mechanism may include a threaded drive screw 160 having a proximal end 162, an opposite distal end 164, and a drive-screw axis D (FIGS. 3-6) extending through the proximal and distal ends 162, 164. The drive-screw axis D is preferably parallel to or lies within the clamp dividing plane P. In FIG. 5, the drive-screw axis D coincides with the clamp dividing plane P due to the edgewise view of the clamp dividing plane P. A drive knob 166 may be non-rotatably secured to the proximal end 162 of the drive screw 160. A proximal portion 104 of the anchor body 100 may have a knob bore 106 telescopically engaging the drive knob 166. The drive knob 166 (FIG. 6) may include a drive-knob nut 168 non-rotatably secured to the drive screw 160; as shown, the knob may be secured to the proximal end 162 of the drive screw 160. The drive knob 166 may include a drive-knob body 166a with an internal socket 166b non-rotatably engaging the drive-knob nut 168.

Continuing to refer to FIGS. 4-9, the closing mechanism may include the drive body 140, which may be located in a distal direction from the anchor body 100. The drive body 140 may be located between the anchor plates 120, 122. The drive body 140 may be supported for axial movement along the drive-screw axis D and may have a drive-screw landing, which may comprise an outer depression 142 for receiving the distal end 164 of the drive screw 160. The drive-screw landing may be or include an inner depression 146 (FIGS. 6-7) extending distally from a principal distal-facing surface 144 of the outer depression 142. A thrust bearing 180 (FIG. 6) may be received in and fitted to the principal distal surface 144 of the outer depression 142 and may have a bore 182 fitted to the distal end 164 of the threaded drive screw 160. The drive body 140 may include a pair of opposing rails 150 externally engaging a pair of opposite surfaces, such as opposite edges 120b, 122b of at least one of the anchor plates 120, 122, which may extend in a direction parallel to, or at least partially parallel to, the drive-screw axis D. Although the opposite surfaces depicted are edges 120b, 122b of the anchor plates 120, 122, the opposing rails 150 alternatively may engage a pair of opposite surfaces of in internal track or slot formed in the anchor plates 120, 122.

Referring to FIGS. 3-9, the closing mechanism may include a first drive-body link 200 having a first end 200a pivotally attached to the drive body 140 and a second end 200b pivotally attached to the first leg 52 at a first link joint 210 radially spaced from the main shaft 90. The closing mechanism may include a second drive-body link 202 having a first end 202a pivotally attached to the drive body 140 and a second end 202b pivotally attached to the second leg 54 at a second link joint 212 radially spaced from the main shaft 90. The first and second drive-body links 200, 202 are omitted from the partial sectional view of FIG. 6 for clarity. Distal movement of the drive body 140 with respect to the main shaft 90 may urge the first and second drive-body links 200, 202 at least partially distally, such that the drive-body links 200, 202 urge the first ends 52a, 54a and the second ends 52b, 54b of the legs 52, 54 to pivot toward one another to provide a clamping action between the first ends 52a, 54a and between the second ends 52b, 54b of the first and second legs 52, 54, which may include a clamping action between respective feet 70 carried by the respective ends, as discussed below. A drive-body pin 148 may extend parallel to, or at least partially parallel to, the main shaft 90 and may pivotally engage both the first end 200a of the first drive-body link 200 and the first end 202a of the second drive-body link 202 for pivotal attachment to the drive body 140 through a drive-body pin hole 149 (FIGS. 5, 7, and 9) oriented transversely with respect to the drive-screw axis D. At least one anchor plate 120, 122 may include an internal pin track 120a, 122a engaging a side surface 148a (FIGS. 4-5) of the drive-body pin 148. The internal pin tracks 120a, 122a may extend parallel to the drive screw axis D. The drive body 140 preferably has a drive-body cavity 152 to allow the first ends 200a, 202a of the drive-body links 200, 202 to be pivotally mounted adjacent internal surfaces 152a, 152b, 152c (FIG. 8) of the cavity 152 rather than protruding from an external surface of the drive body 140.

The closing mechanism may be configured so that upon a rotation of the drive screw 160 in a first direction, the drive screw 160 advances distally and reduces a distance between the distal end 164 of the drive screw and the main shaft 90, reducing a drive-body gap 230 (FIG. 6) in which the drive body 140 is movable between the distal end 164 of the drive screw 160 and the main shaft 90. To effect a clamping action, preferably either the drive screw 160 advancement engages the drive-screw landing on the drive body 140, thereby urging the drive body 140 distally, or the user may manually compress the first and second legs 52, 54 around the clamped object, and utilize the distal advancement of the drive-screw 160 to lock the drive body 140 in place.

The closing mechanism may be configured so that upon a rotation of the drive screw 160 in a second direction, the drive screw 160 translates proximally with respect to the drive body 140 and increases the distance between the distal end 164 of the drive screw 160 and the main shaft 90, increasing the drive-body gap 230 in which the drive body 140 is movable between the distal end 164 of the drive screw 160 and the main shaft 90.

Figure 20:
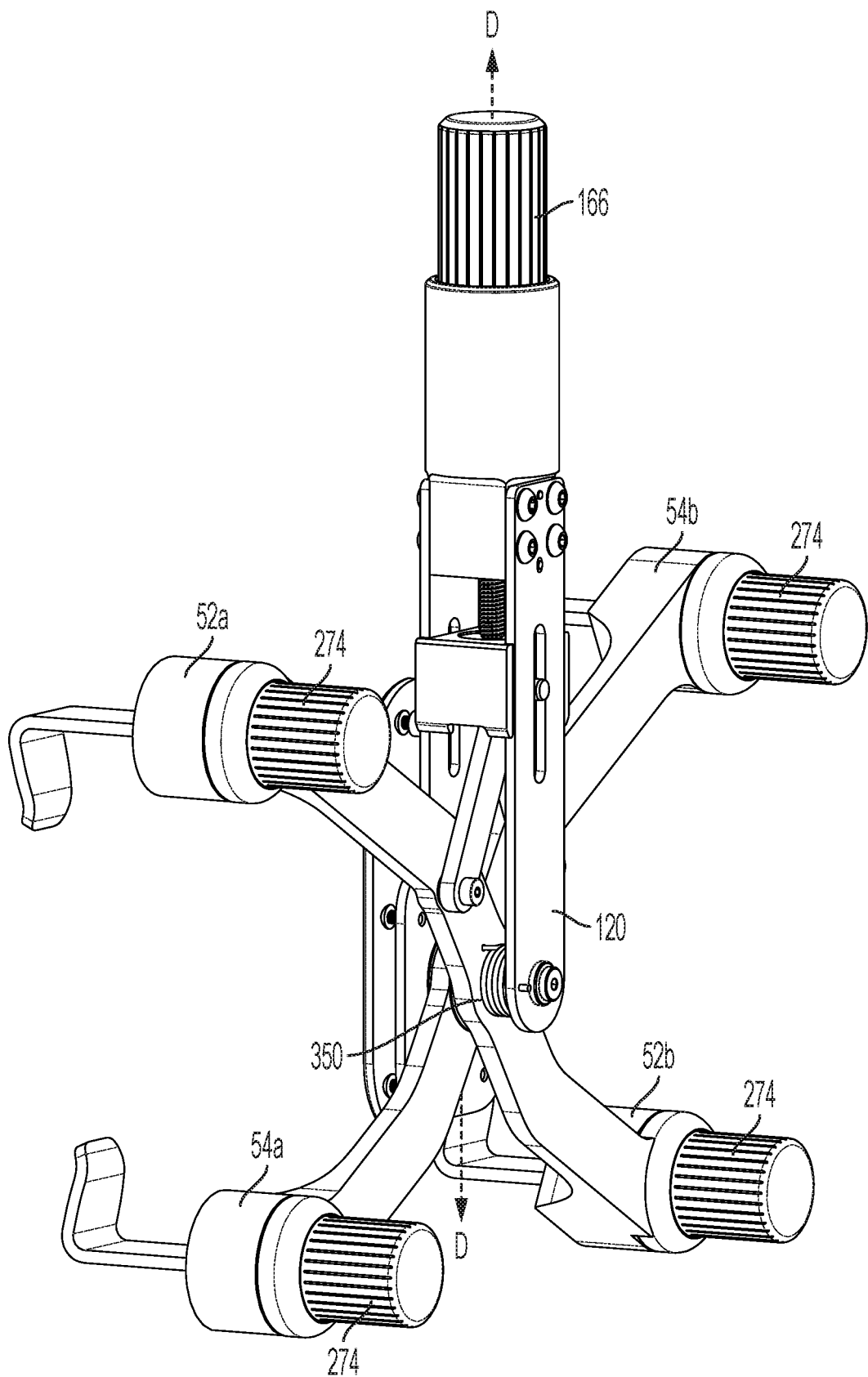
FIG. 20 is a perspective view of an embodiment of an alternative clamp for the computing device stand of FIG. 1 including a biasing member.
Figure 21:
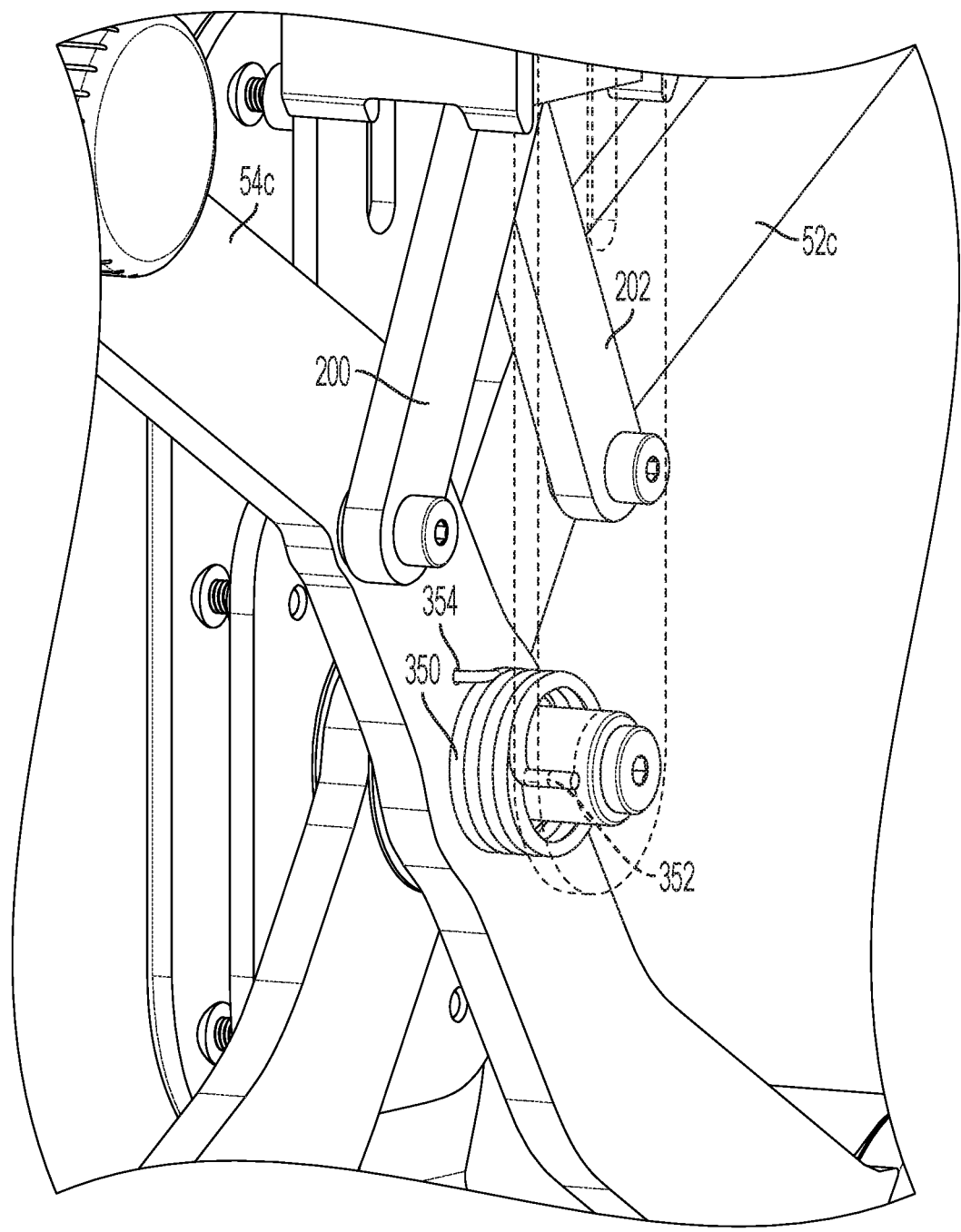
FIG. 21 is a magnified partial perspective view of the clamp of FIG. 20.
Figure 22:
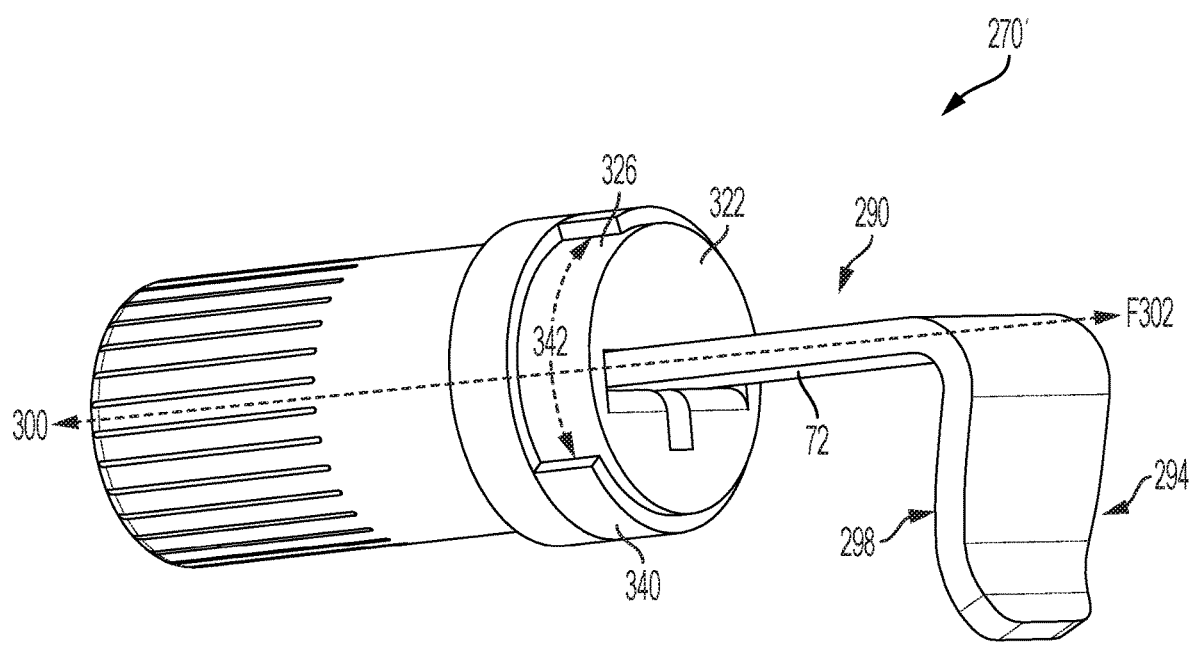
FIG. 22 is a right rear perspective view (with respect to FIG. 1) of a second embodiment of a foot assembly of the clamp of FIG. 3.
Figure 23:
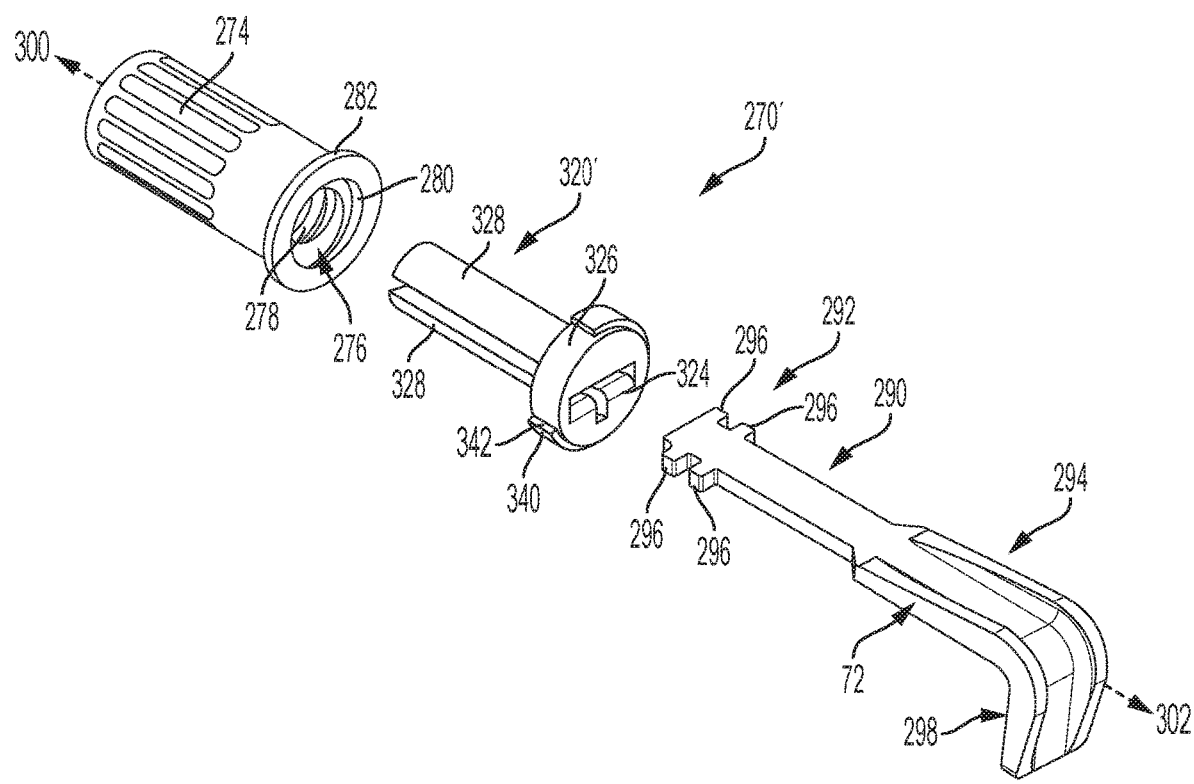
FIG. 23 is a right rear upper perspective exploded view (with respect to FIG. 1) of the foot assembly of FIG. 22.
Figure 24:
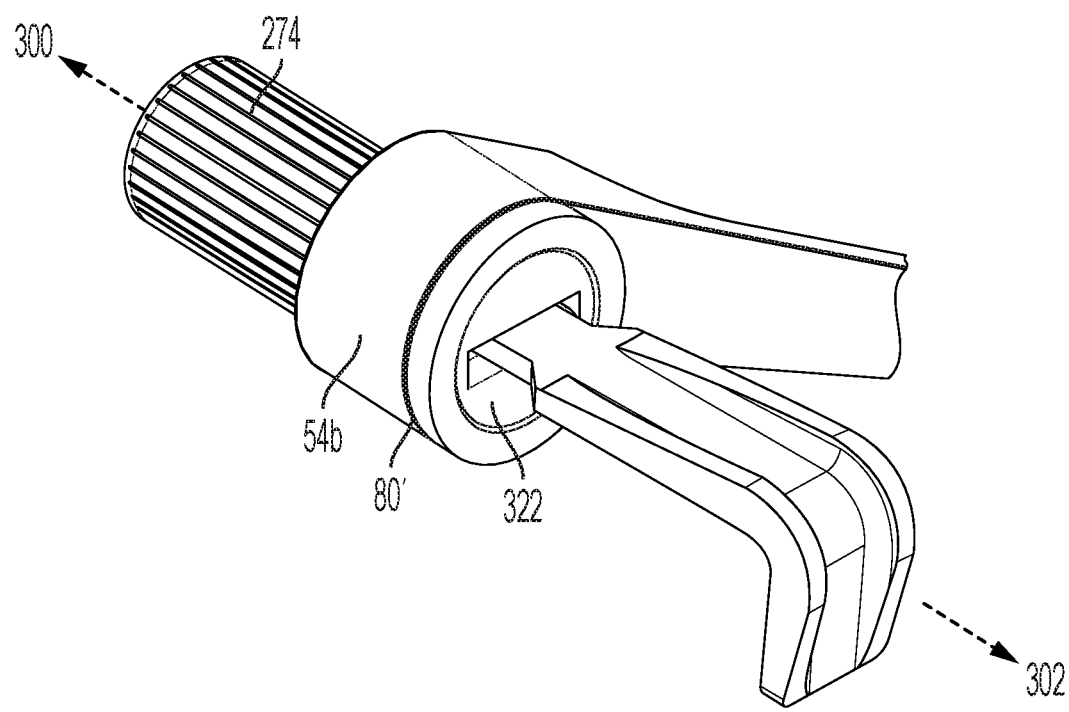
FIG. 24 is a right rear upper perspective view of the foot assembly of FIG. 22 mounted in a leg.
Figure 25:
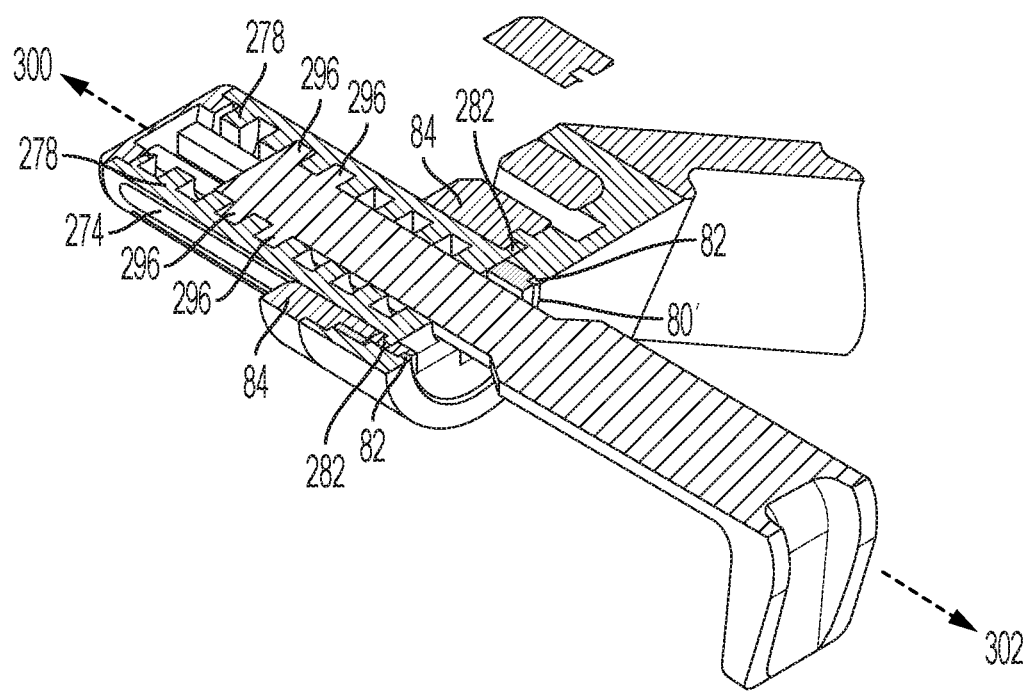
FIG. 25 is a right rear upper perspective sectional view of the foot assembly and leg of FIG. 24.
Figure 26:
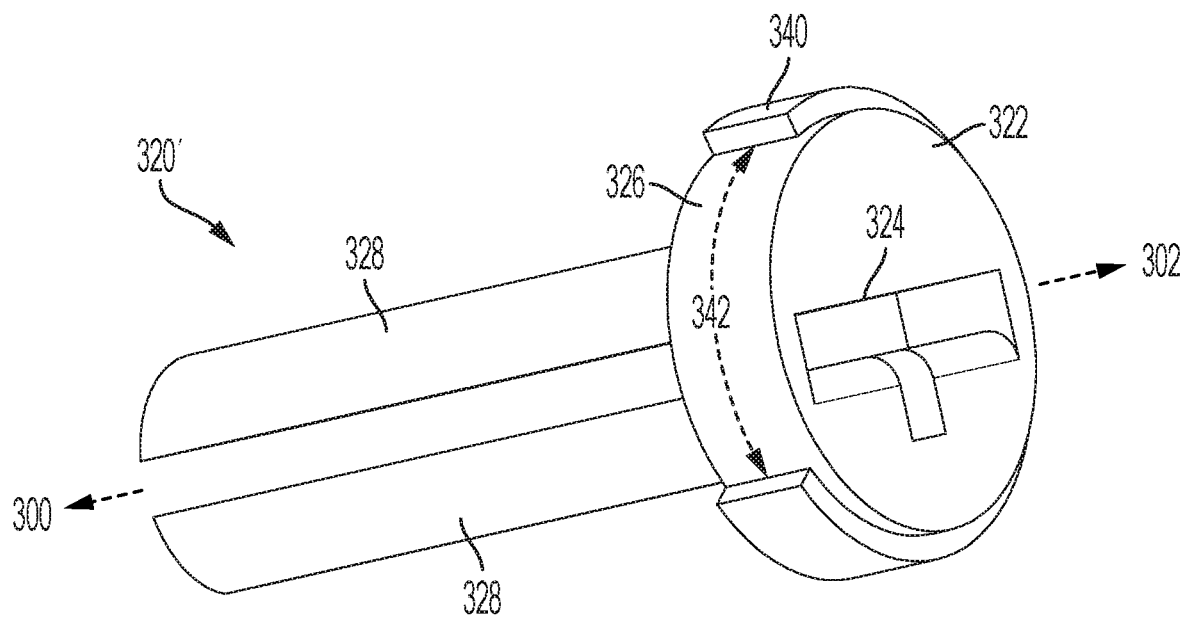
FIG. 26 is rear right perspective view (with respect to FIG. 1) of an orientation collar of the foot assembly of FIG. 22.
Figure 27:
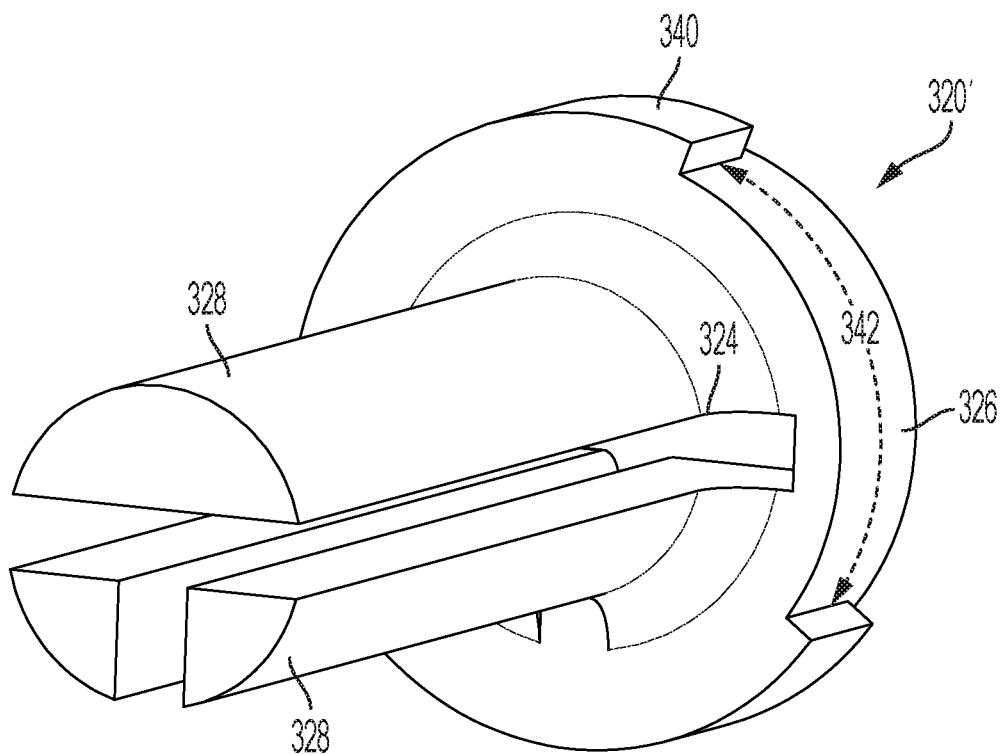
FIG. 27 is an enlarged front perspective view (with respect to FIG. 1) of the orientation collar of FIG. 26.
Figure 28:
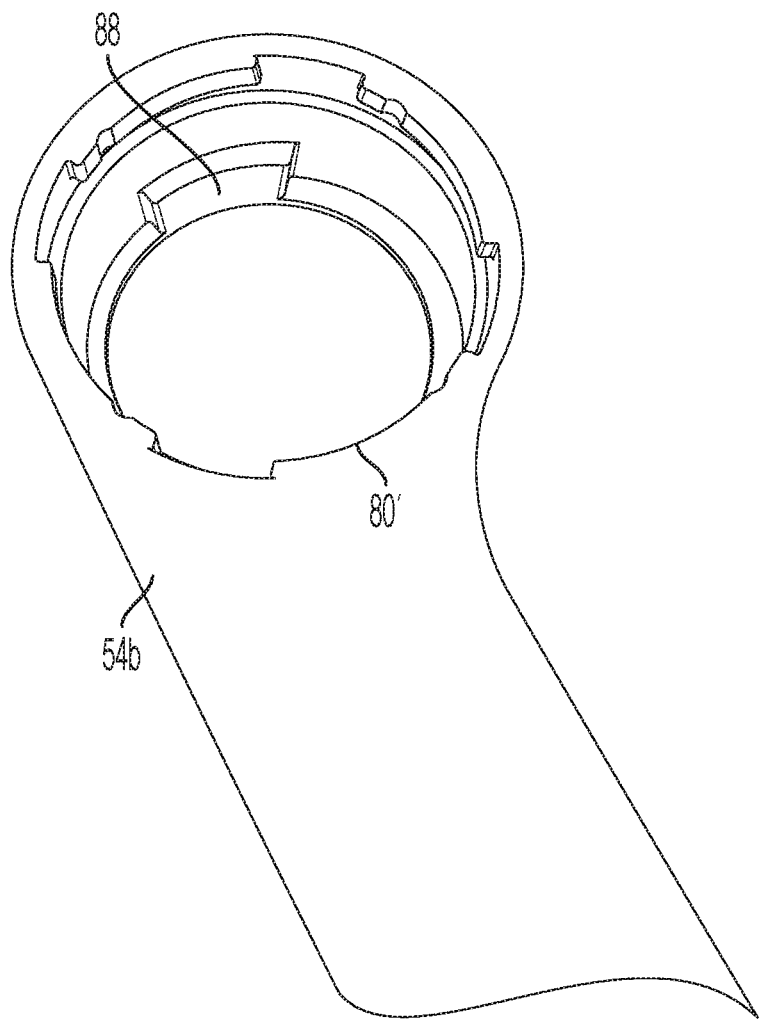
FIG. 28 is an enlarged rear perspective view of the foot mount of the leg of FIG. 24.

The clamp 50 may include a biasing member, which may, for example, take the form of a spring 350 (FIGS. 20, 21) biasing the first and second legs 52, 54 to urge the first ends 52a, 54a toward one another and the second ends 52b, 54b toward one another. In the embodiment illustrated in FIGS. 20 and 21, the spring 350 is fixed in a first spring seat in the form of a hole 352 in the anchor plate 120 and second spring seat in the form of a hole 354 in the either of the first leg 52 and the second leg 54 The biasing member is shown as the spring 350 but may take the form of any elastic or biasing member suited to the application, as may be known to those of skill in the art. The biasing member (whether a coil spring or other biasing member) may aid the user by urging the first and second legs 52, 54 toward one another so that the legs 52, 54 tend to close upon a frame rail, other support, or other clamped body, allowing the user obtain a degree of stability and alignment in the mounting of the clamp 50 before tightening the clamp 50.

Figure 12:
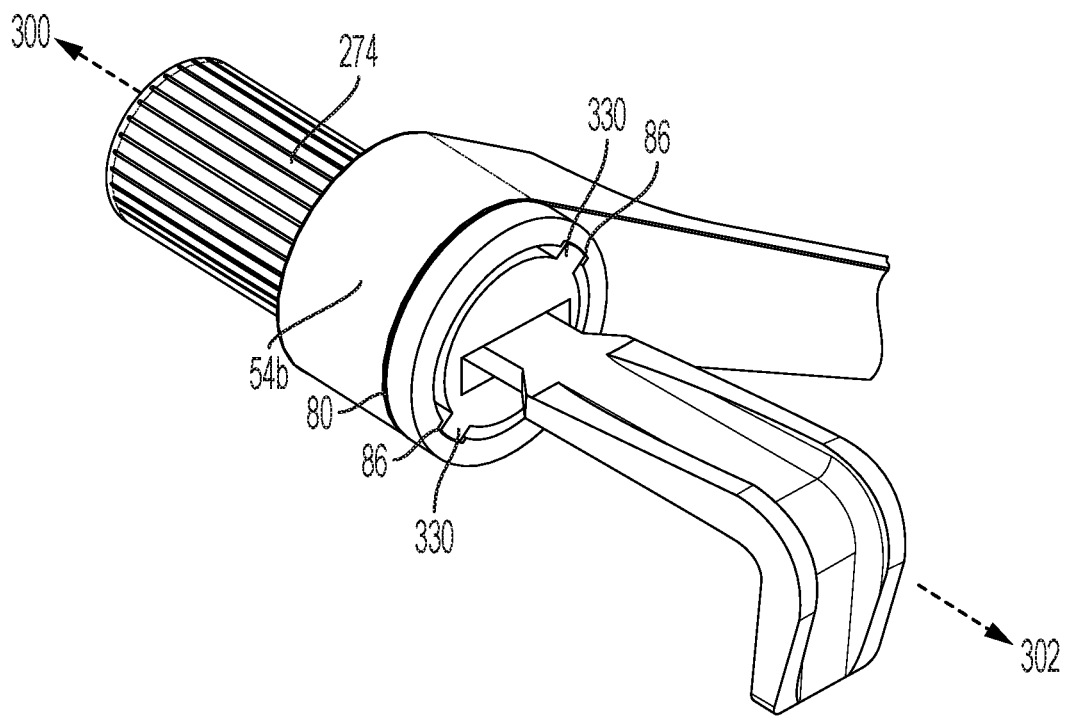
FIG. 12 is a right rear upper perspective detail view of the foot assembly of FIG. 10 mounted in a leg.
Figure 13:
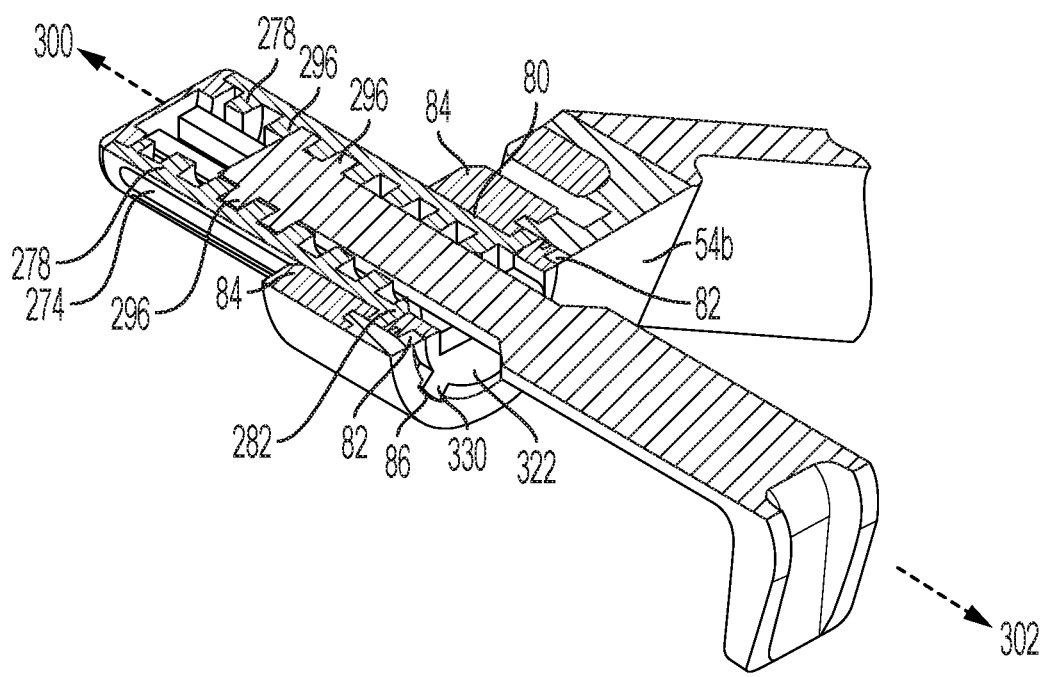
FIG. 13 is a right rear upper perspective sectional detail view of the foot assembly and leg of FIG. 12.
Figure 14:
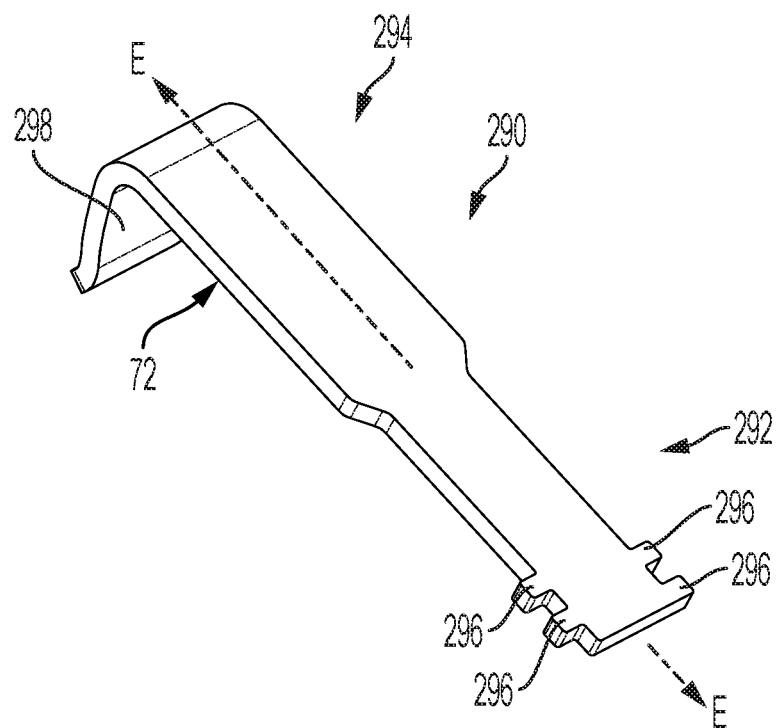
FIG. 14 is right front upper perspective view (with respect to FIG. 1) of an extension of the foot assembly of FIG. 10.
Figure 15:
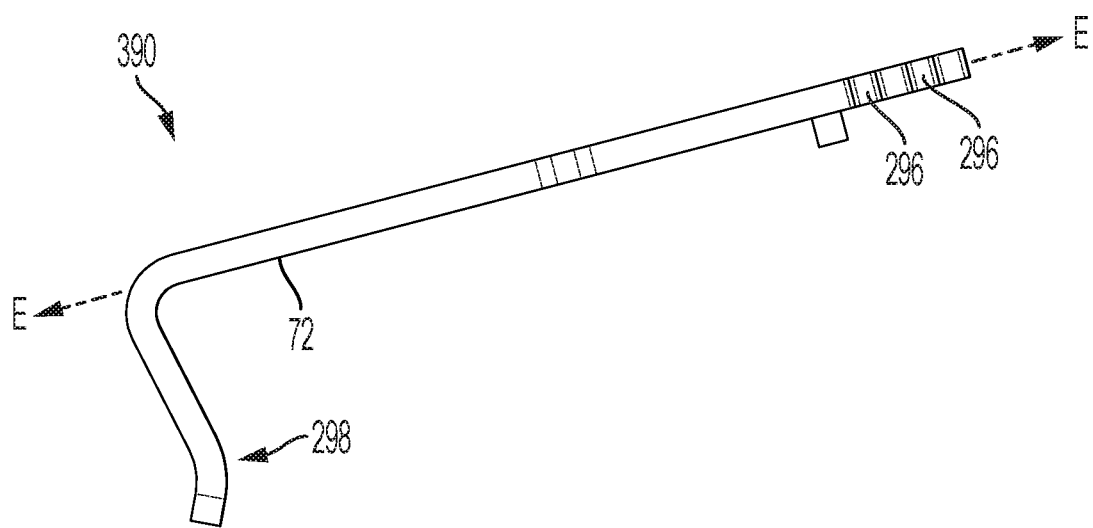
FIG. 15 is left side elevational view (with respect to FIG. 1) of a second embodiment of an extension of the foot assembly of FIG. 10.
Figure 16:
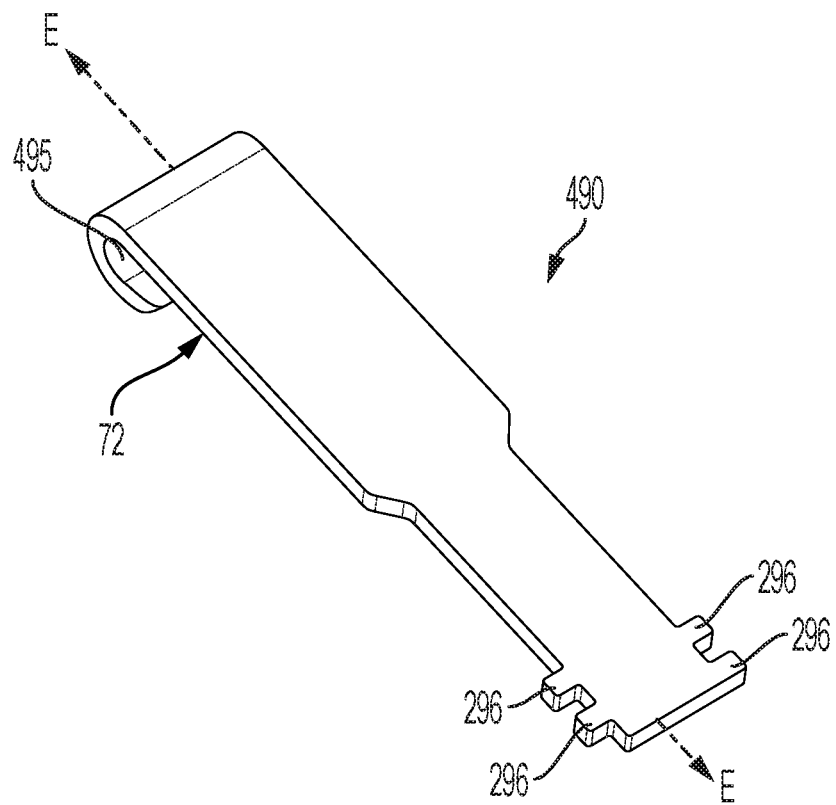
FIG. 16 is a right front upper perspective view (with respect to FIG. 1) of a third embodiment of an extension of the foot assembly of FIG. 10.
Figure 17:
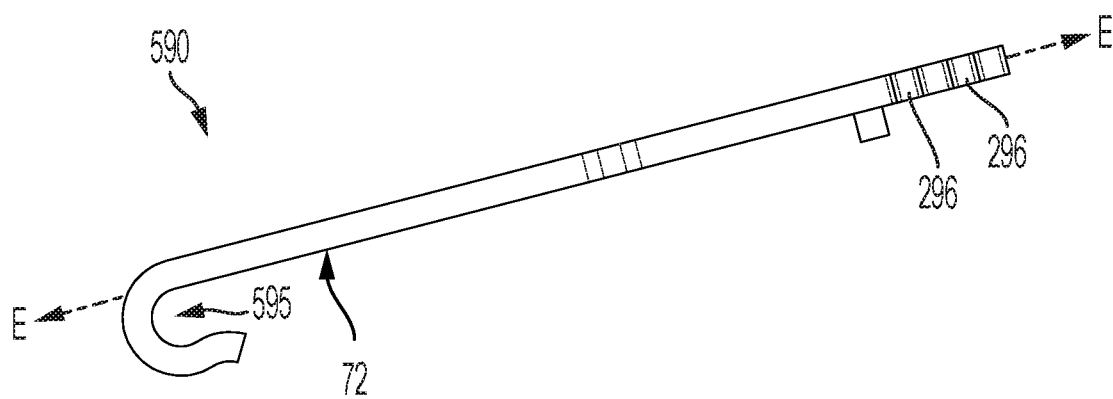
FIG. 17 is a left side elevational view of a fourth embodiment of an extension of the foot of assembly FIG. 10.
Figure 18:
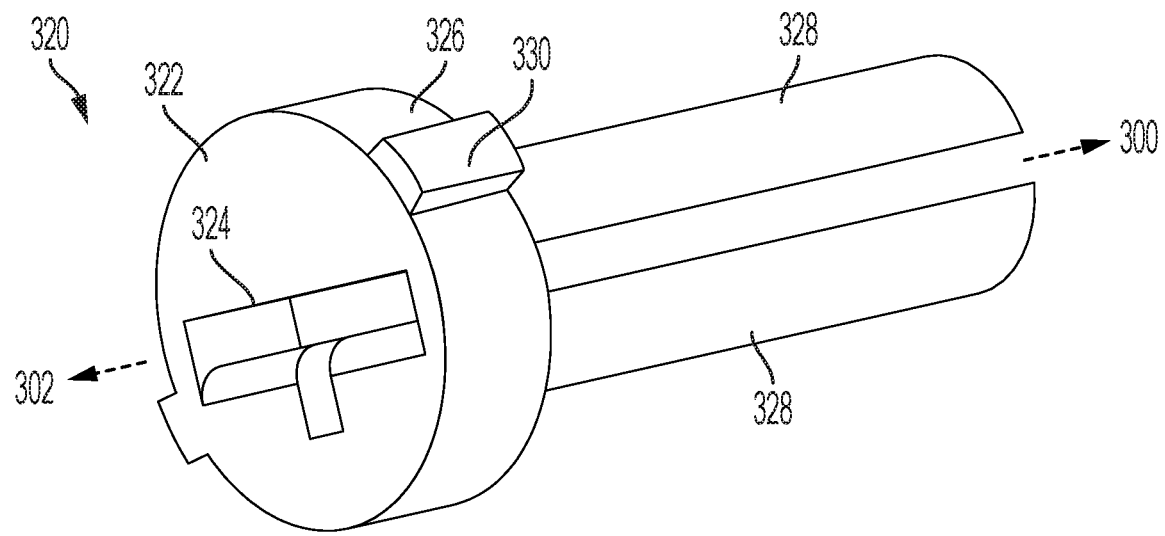
FIG. 18 is rear left perspective view (with respect to FIG. 1) of an orientation collar of the foot assembly of FIG. 10.
Figure 19:
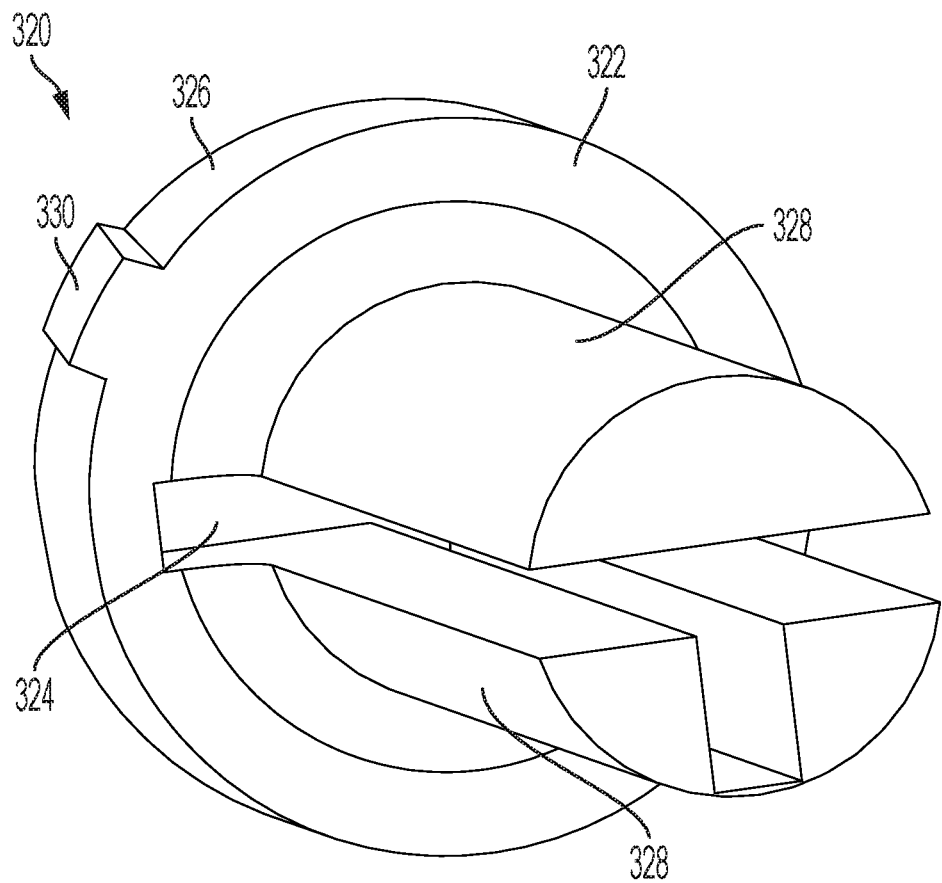
FIG. 19 is an enlarged front perspective view (with respect to FIG. 1) of the orientation collar of FIG. 18.

Referring to FIGS. 3-4 and 10-15, each foot 70 may include a foot assembly 270 operatively secured in a foot mount in the form of a foot mounting hole 80 in one of the first end 52a of the first leg 52, the first end 54a of the second leg 54, the second end 52b of the first leg 52, and the second end 54b of the second leg 54. Referring to FIGS. 12 and 13, the foot assembly 270 is shown as engaged with the foot mounting hole 80 in the second end 54b of the second leg 54; the foot assembly 270 may engage the other foot mounting holes 80 in the same manner. The foot assembly 270 may have a foot-assembly base having a base end and a free end and a longitudinal axis F (FIG. 10) defining a base direction 300 and an opposite free direction 302. The base may be formed by a knob 274 having a bore 276 with internal threads 278 and an opening 280 at a free-direction end thereof. The knob 274 may have a radially outwardly extending external flange 282. The flange 282 may be operatively secured in the foot mounting hole 80 so that the knob 274 is rotatable and axially constrained with respect to the foot mounting hole 80. The foot mounting hole 80 may have a mounting flange 82 or other inward projection or projections engaging the flange 282 of the knob 274, or engaging the orienting collar 322, from, for example, the free direction 302. A retaining ring 84 (FIGS. 3-4, 13) may be snap fitted into the mounting hole 80 to engage the flange 282 of the knob 274 from the base direction 300 to constrain the knob 274 axially with respect to the foot mounting hole 80.

Figure 34A:
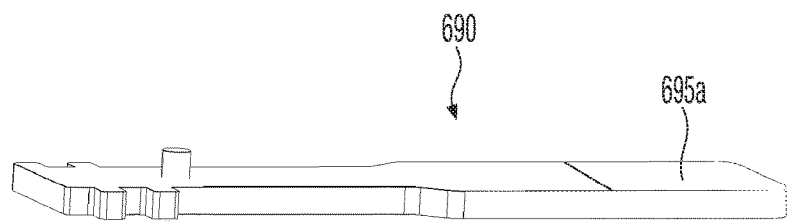
FIG. 34A is a front right partial perspective view of the foot assembly of the clamp of FIG. 34.
Figure 34B:
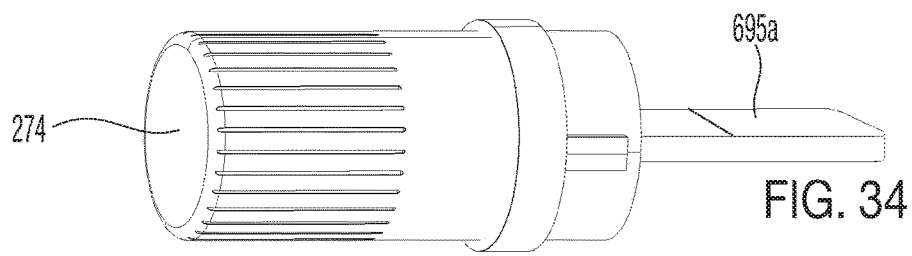
FIG. 34B is a front right partial perspective view of the extension of FIG. 34A.
Figure 34:
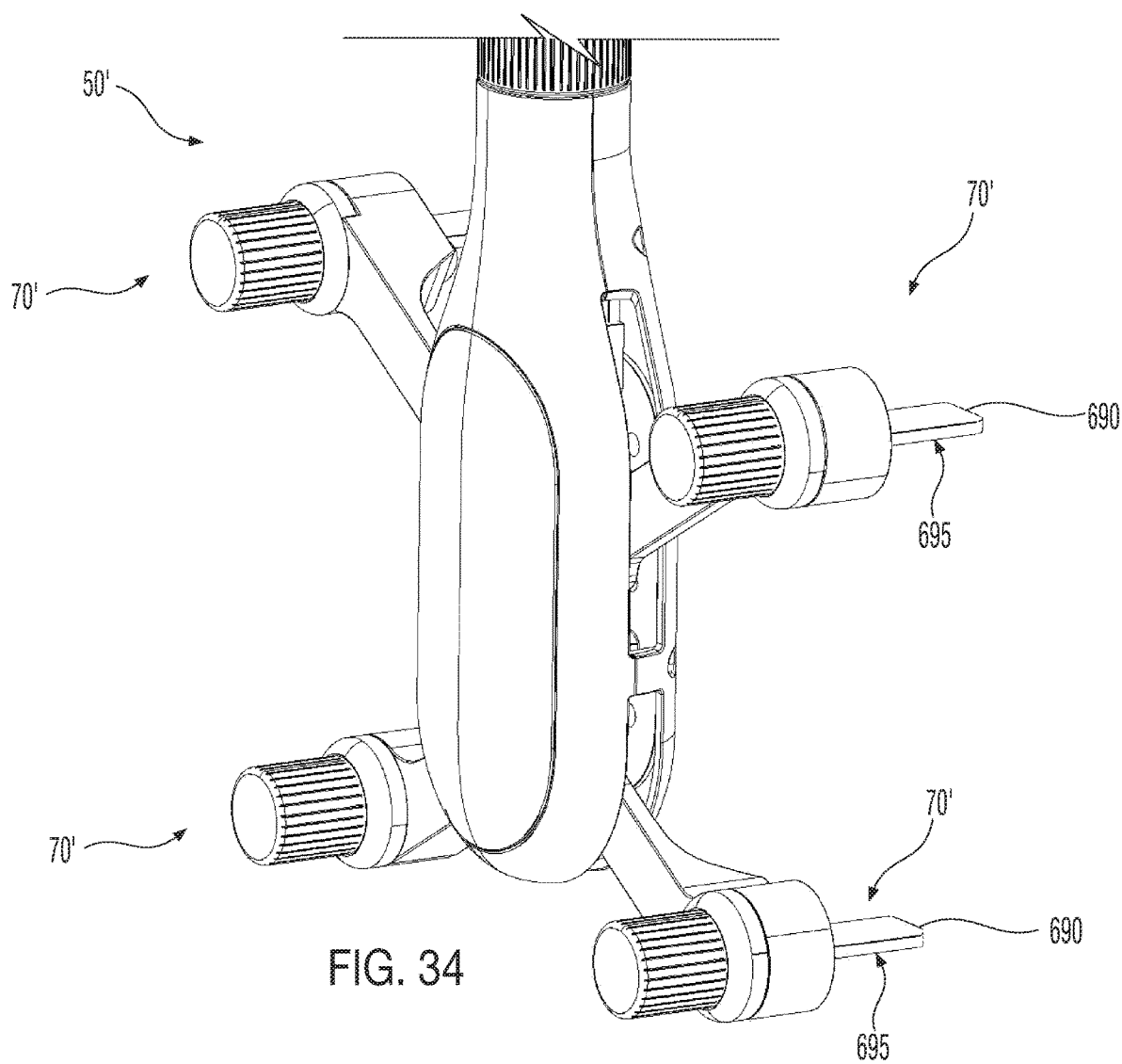
FIG. 34 is front right partial perspective view of a clamp comprising foot assemblies including a fifth embodiment of an extension thereof.

An extension 290 may extend along an extension axis E and may include the clamping surface 72 of the foot 70. The clamping surface 72 may be parallel to, or generally parallel to, the extension axis E, or may be angled with respect thereto. The extension 290 may have an extension base end 292 and an extension free end 294. The extension base end 292 may have one or more projections 296, oriented generally transverse to, or generally perpendicular to, the extension axis E, for engaging the internal threads 278 of the knob 274 such that rotation of the knob 274 in a first direction causes the extension 290 to protrude further with respect to the knob 274, and rotation of the knob 274 in a second direction causes the extension 290 to retract with respect to the knob 274. The extension 290 may have an angled gripping surface 298 disposed non-colinearly with respect to (at an angle with) the extension axis E. In an alternative embodiment (FIG. 15), an extension 390 is substantially identical to the extension 290, except that the extensions 290, 390 differ in length and thus may be suited to engaging differently sized support members, clamped bodies, or the like. Third and fourth embodiments of extensions 490, 590 differ from the extensions 290, 390 in that each extension 490, 590 has a hooked gripping surface 495, 595. Referring to FIGS. 34, 34A, and 34B, fifth embodiments of extensions 690 may have a gripping surface 695 that is parallel to, or generally parallel to, the extension axis E. The gripping surface 695 may be soft or elastic and may have a relatively high coefficient of friction to promote gripping of clamped objects. The gripping surface 695 may have a clamping pad 695a attached thereto, which may be soft or elastic and may have a relatively high coefficient of friction. The extensions 690 may be advantageous in securing the a clamp or laptop surface to a flat, expansive body such as a countertop, which could prove difficult to grip with, for example, the extensions 490, 590 with hooked gripping surfaces 495, 595.

The knob 274 thus may be used in combination with the extensions 290, 390, 490, 590 (including combinations of different embodiments of the extensions) to adjust the engagement of the foot assembly 270 with a bed rail 42 or another member of another frame rail, other support, or other clamped body. A set of different and interchangeable embodiments of the extensions 290, 390, 490, 590, 690 may be provided to and selectable by the user for engaging the foot assembly with the bed rail 42 or another member of another frame rail, a countertop or table, or other support or clamped body.

An orienting collar 320 may be provided and may limit the rotation of the extension 290 (or other embodiments) to prevent the foot 70 from becoming oriented with the gripping surface 298 in an undesirable orientation. Referring to FIGS. 10-13, 18, and 19, the orienting collar 320 may have a disc 322, which preferably may be short in length and which may abut the flange 282 of the knob 274 to aid in positioning the orienting collar 320. The disc 322 may have a longitudinal slot 324 therethrough and a projection 328 extending in the base direction 300 (two spaced apart, parallel projections 328 are shown). The disc 322 may have a radially extending protrusion such as a tab 330 extending radially from an outer circumferential edge 326 thereof. The extension 290 may pass through the slot 324 and between the projections 328 before engaging the internal threads 278 of the knob 274. The slot 324 and the extension 290 may be shaped so that the orienting collar 320 pivots with and does not rotate with respect to the extension 290 when the extension 290 is pivoted with respect to the first leg 52. The foot mounting hole 80 may have at least one radially outwardly extending recess 86. The recesses 86 may be configured to accommodate the tabs 330 of the orienting collar 320, and be sized to allow for constrained movement of the tabs 330 therein, thus providing for constrained pivoting of the orienting collar 320 and the extension 290, 390, 490, 590 with respect to the foot-mounting hole 80. The constrained pivoting of the collar 320 may prevent the collar 320 from turning when the knob 274 is turned, thus allowing the degree of protrusion of the extension 290, 390, 490, 590, 690 to be adjusted as described above, while also allowing the extension 290 to remain oriented with respect to the bed rail 42 or another member of another frame rail, other support, or other clamped body as the legs 52, 54 move from the fully opened toward the fully closed position. The constrained pivoting of the collar 320 may vary among the various collars 320 (and 320', discussed below) of a particular clamp 50, as each collar 320, 320' in a particular clamp 50 may experience a different range of motion and different orientation through the range of motion of the clamp 50.

Referring to FIGS. 22-28, in a second embodiment, a foot assembly 270', substantially identical to foot assembly 270, with the differences discussed herein, may include a second embodiment of the collar 320', with the collar 320' being in many respects identical to the collar 320, with differences being discussed herein. The collar 320' may have a flange 340 extending radially from the outer circumferential edge 326 of the disc 322, with the flange 340 having a circumferential gap 342 formed therein. The foot mount may comprise a foot-mounting hole 80' having a radially inwardly extending protrusion 88 configured to engage the circumferential gap 342 of the flange 340. The circumferential gap 342 and the radially inwardly extending protrusion 88 may be sized to allow for constrained movement of the radially inwardly extending protrusion 88 within the circumferential gap 342 as the collar 320' pivots with respect to the foot-mounting hole 80', thus providing for constrained pivoting of the orienting collar 320' and the extension 290, 390, 490, 590 with respect to the foot-mounting hole 80'. The purpose and benefit of the constrained pivoting are explained above.

In use, the clamp 50, and other clamps according to the present disclosure, may be configured to be opened by the user and positioned around bed rail 42 or other member of a frame, other support, or other clamped body. The user may then directly or indirectly rotate a drive knob 166 or other torque-application device to tighten the legs 52, 54 of the clamp 50 and secure the clamp 50, including a clamp incorporated into a computing device stand such as the computing device stand 10, to the rail or other member.

Figure 29:
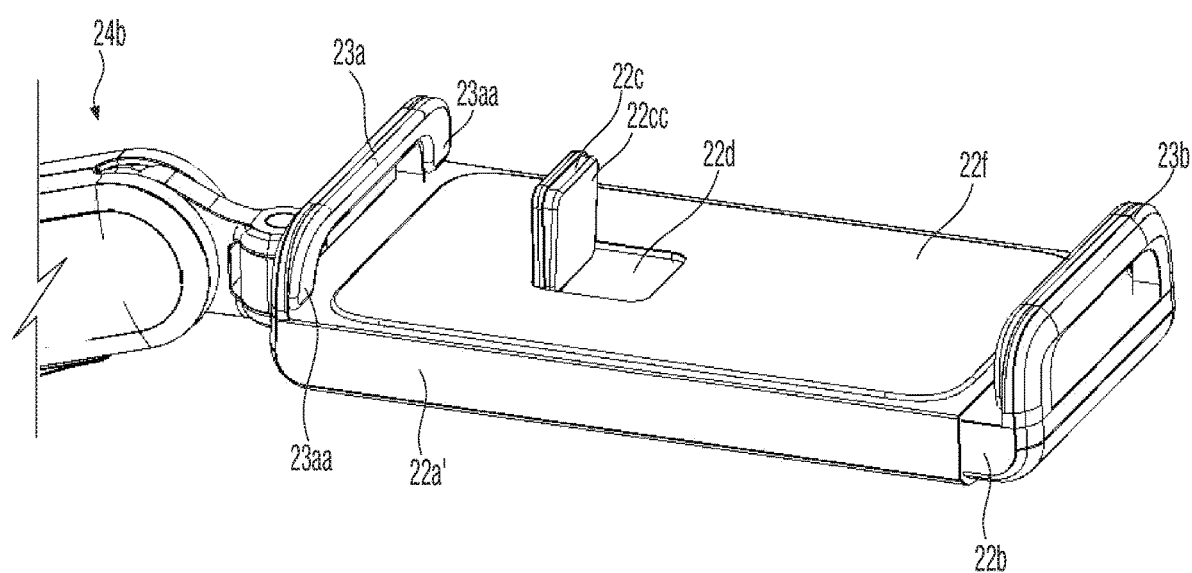
FIG. 29 is an enlarged partial front right perspective view of a computing device stand including an alternative device-receiving attachment.
Figure 30:
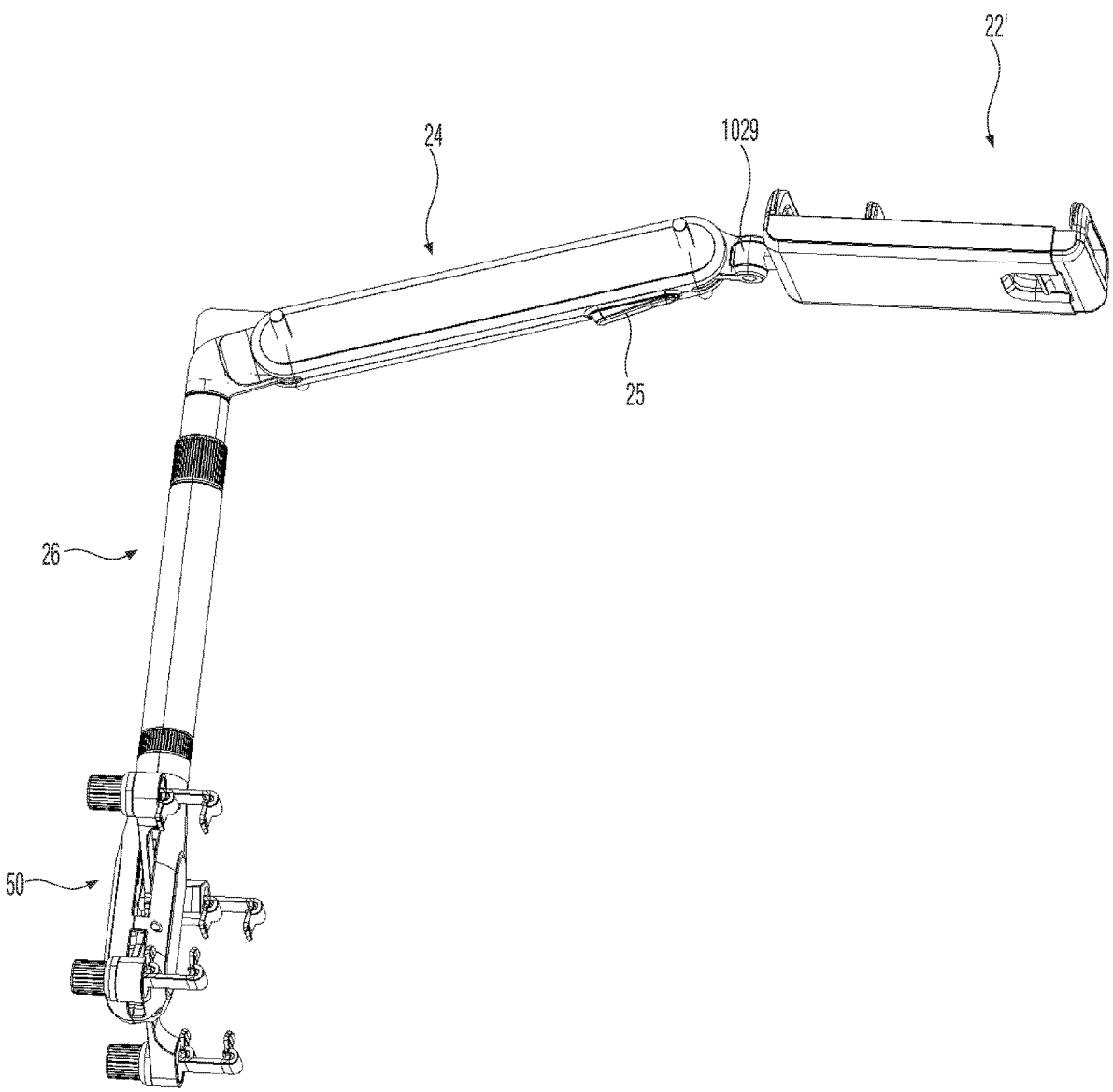
FIG. 30 is a right perspective view of the computing device stand of FIG. 29.
Figure 31:
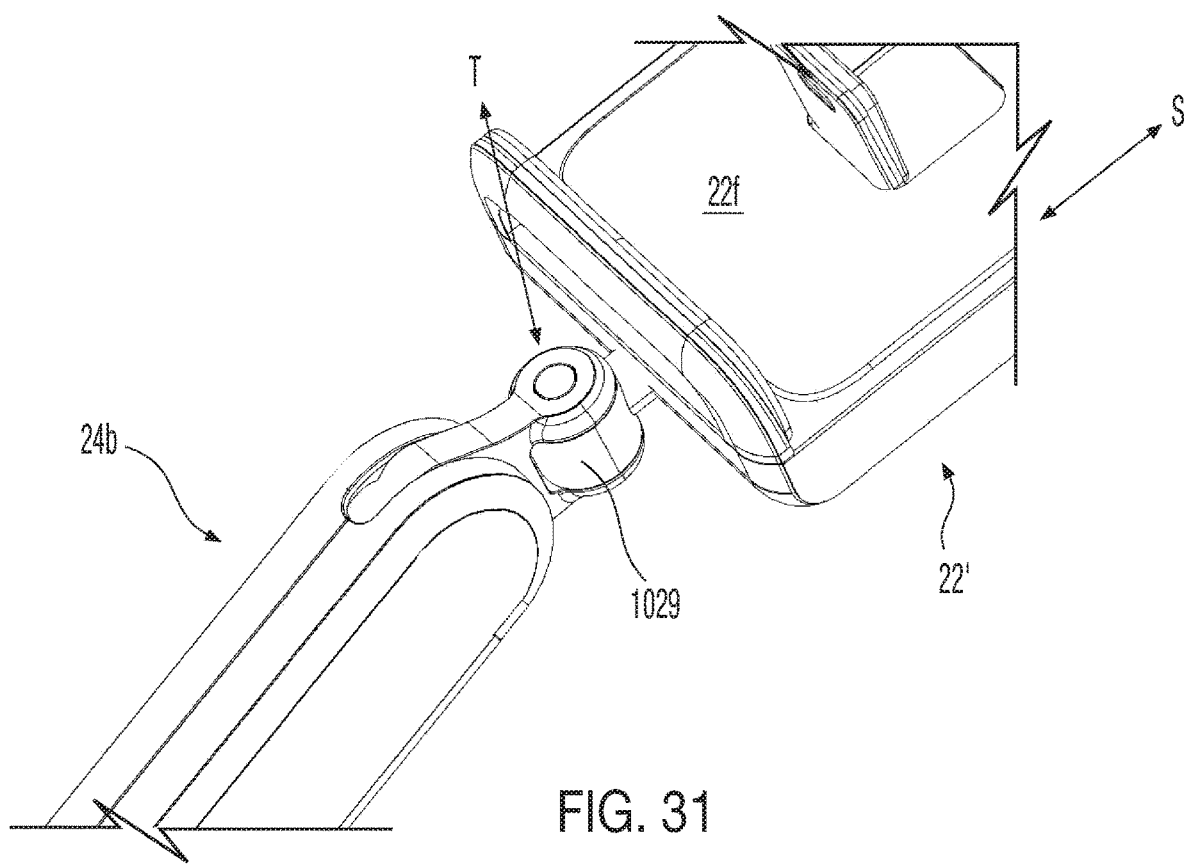
FIG. 31 is an enlarged partial upper right perspective view of the computing device stand of FIG. 29.

Referring to FIGS. 29-31, the device-receiving attachment 22' may have a device-support surface 22f and a principal device-support axis S parallel thereto. The device-receiving attachment may be operatively connected to the second main-arm portion 24b and may be rotatable with respect to the second main-arm portion 24b for a pitch adjustment of the device-receiving attachment 22' and the device-support surface 22f about the principal device-support axis S. The device-receiving attachment 22 may include a transverse device-support axis T oriented transversely with respect to both the principal device-support axis S and the device-support surface 22f, and wherein the device-receiving attachment 22' may be operatively connected to the second main-arm portion 24b and may be rotatable with respect to the second main-arm portion 24b for a yaw adjustment of the device-receiving attachment about the transverse device-support axis T; which connection may be provided by, for example, a friction hinge 1029.

Figure 32:
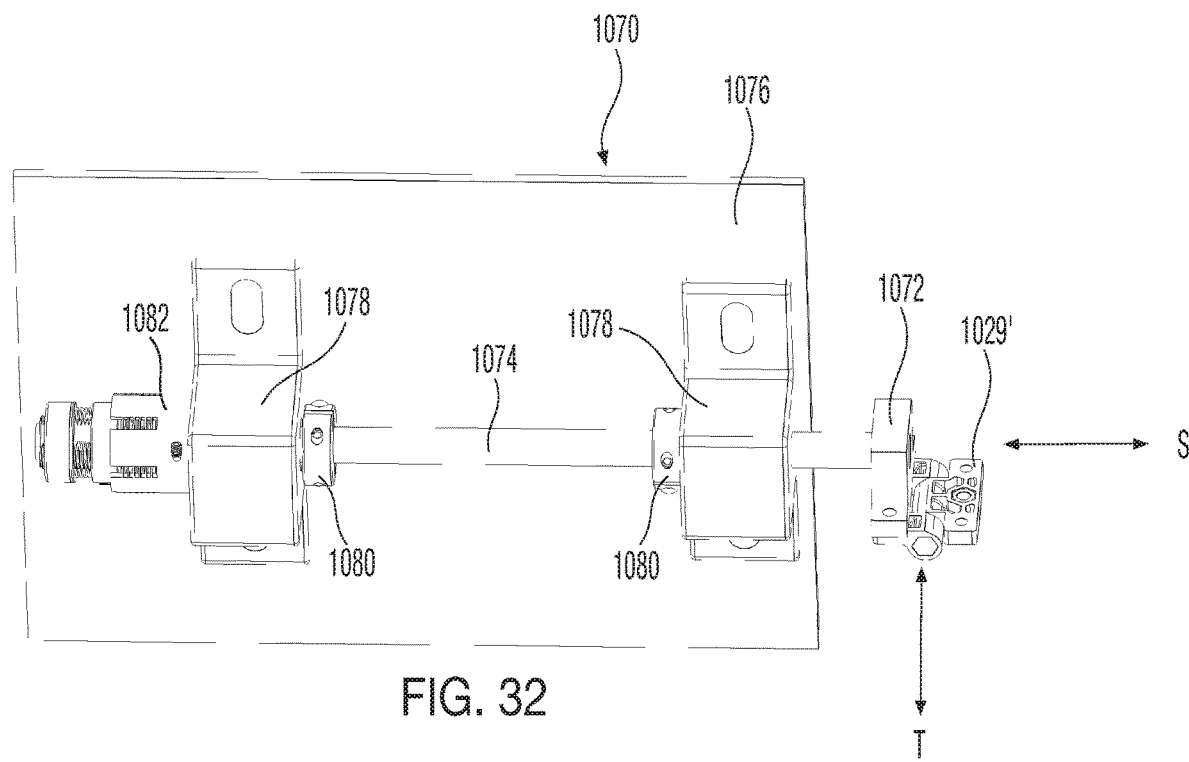
FIG. 32 is an enlarged partial lower perspective cutaway view of the computing device stand of FIG. 29, showing an internal mechanism thereof.
Figure 33:
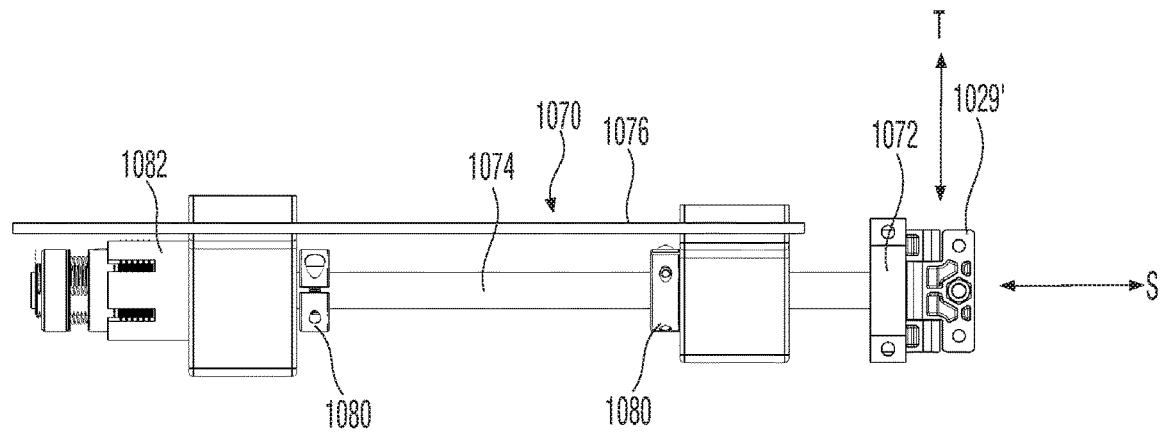
FIG. 33 is an enlarged partial left elevational view of the internal computing device stand of FIG. 32, showing the internal mechanism thereof.

Referring to FIGS. 32-33, the device-receiving attachment 22 may provide a pitch adjustment by a pitch mechanism 1070 operatively connected to mount the device-support surface 22f with respect to the second main-arm portion 24b of the main arm 24. A shaft block 1072 may be mounted for rotation with a friction hinge 1029' with respect to the transverse device-support axis T. The shaft block 1072 may be non-rotatably mounted with respect to a shaft 1074. A platform 1076 may be rotatably attached to the shaft by shaft collars 1078; and the device-receiving attachment 22' and the device-support surface 22f may be attached to the platform 1076 for movement therewith. Shaft clamps 1080 may be non-rotatably coupled to the shaft 1074 to secure the shaft collars 1078, and thus the platform 1078 and the device receiving attachment 22', against axial movement with respect to the shaft 1074. An overload-protection coupling, such as a friction clutch 1082, may be operatively connected between at least one shaft collar 1078 and the shaft 1074 to provide resistance to turning of the shaft collar 1078, and hence resistance to turning of the device-receiving attachment 22' and the device-support surface 22f, with respect to the shaft 1074.

Figure 35:
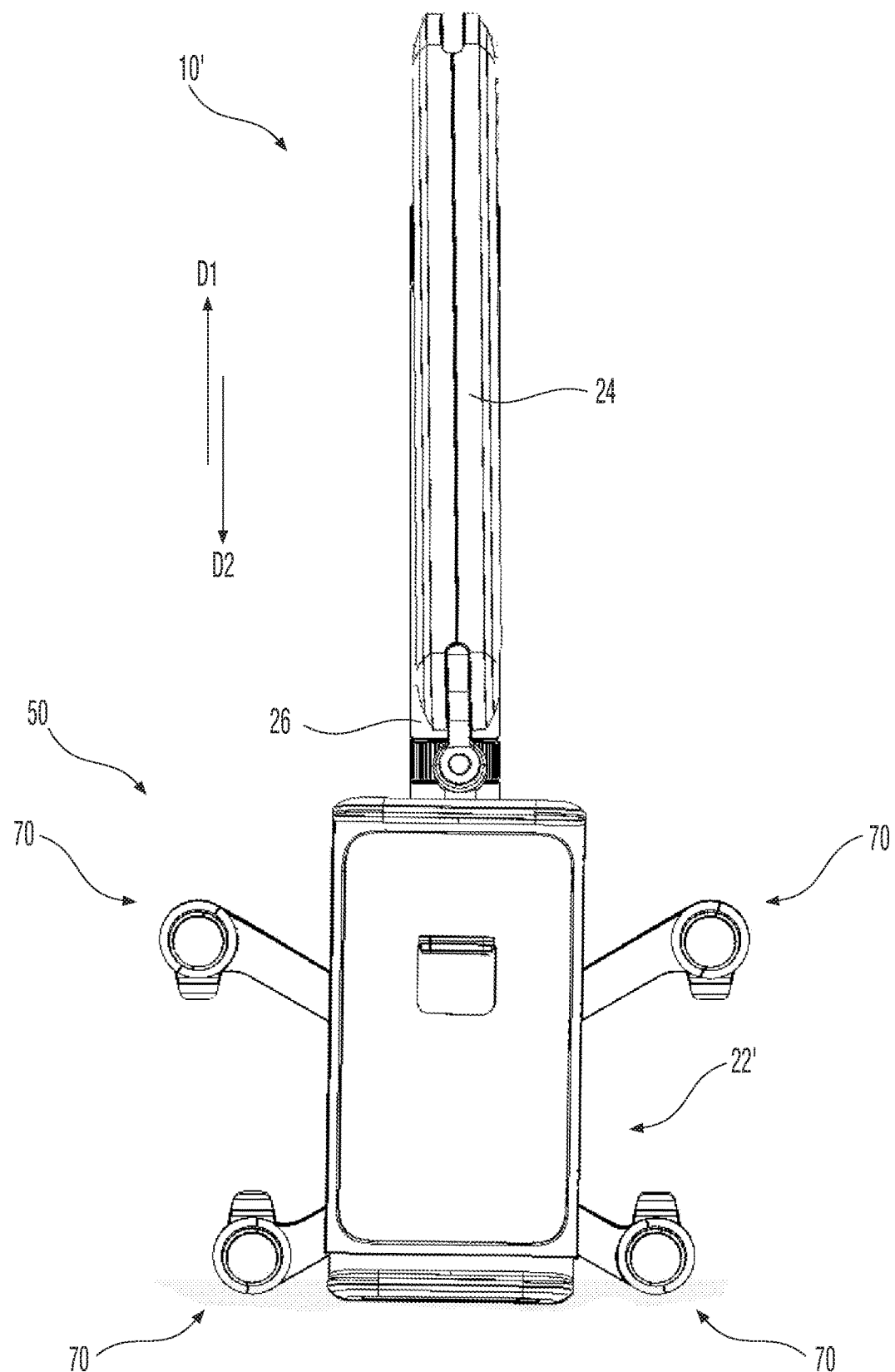
FIG. 35 is a front elevational view of the computing device stand of FIG. 29, shown in a stowed position.

Referring to FIG. 35, in an example of a computing device stand 10', the main arm 24 may be rotatable about the base arm 26 to a stowed main-arm position in which the base arm 26 extends from the clamp 50 in a first direction D1, and the main arm 24 extends from the base arm 26 in a second direction D2.

Figure 36:
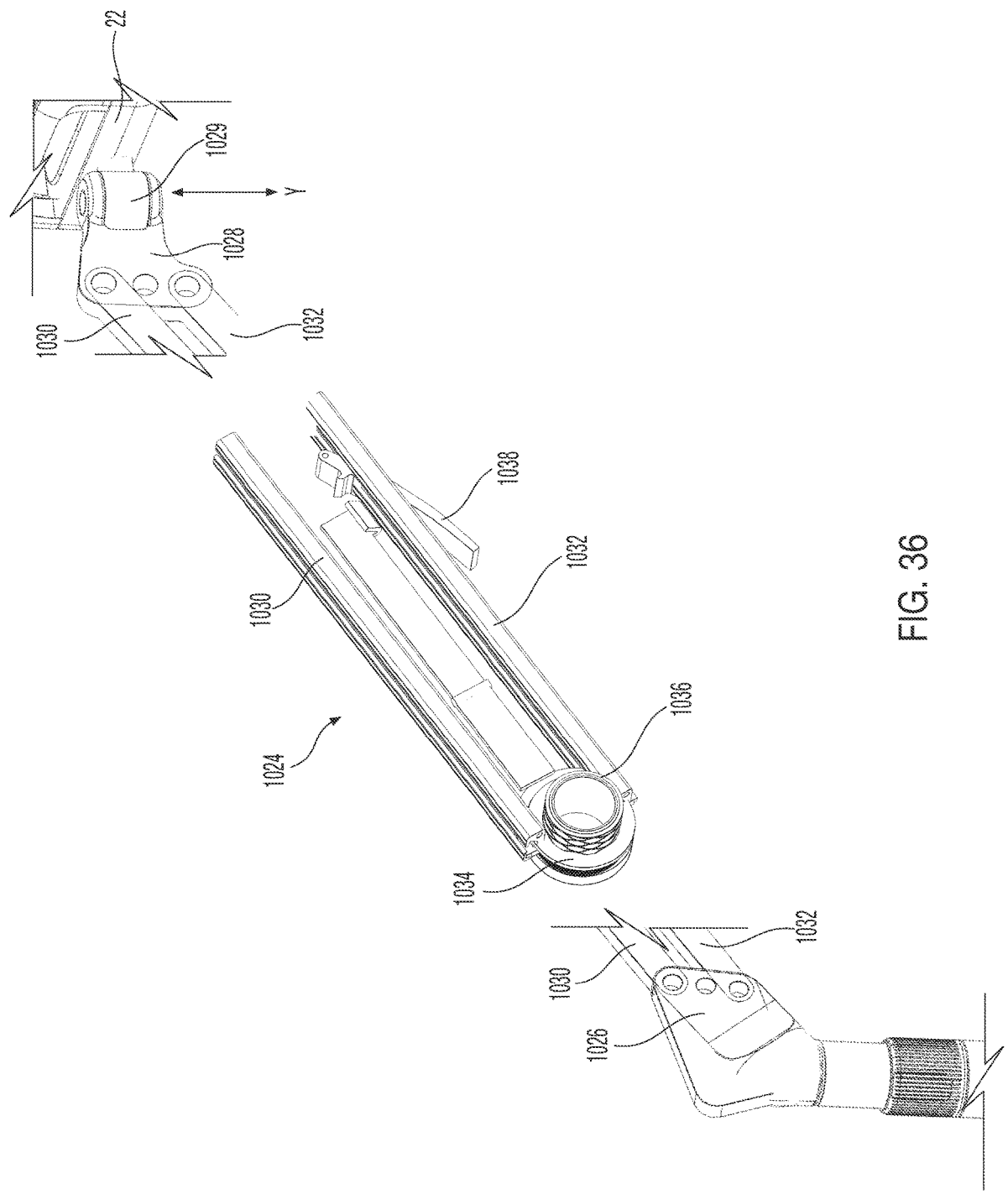
FIG. 36 is an exploded partial cutaway partially schematic perspective view showing a mechanism for a main arm.
Figure 37:
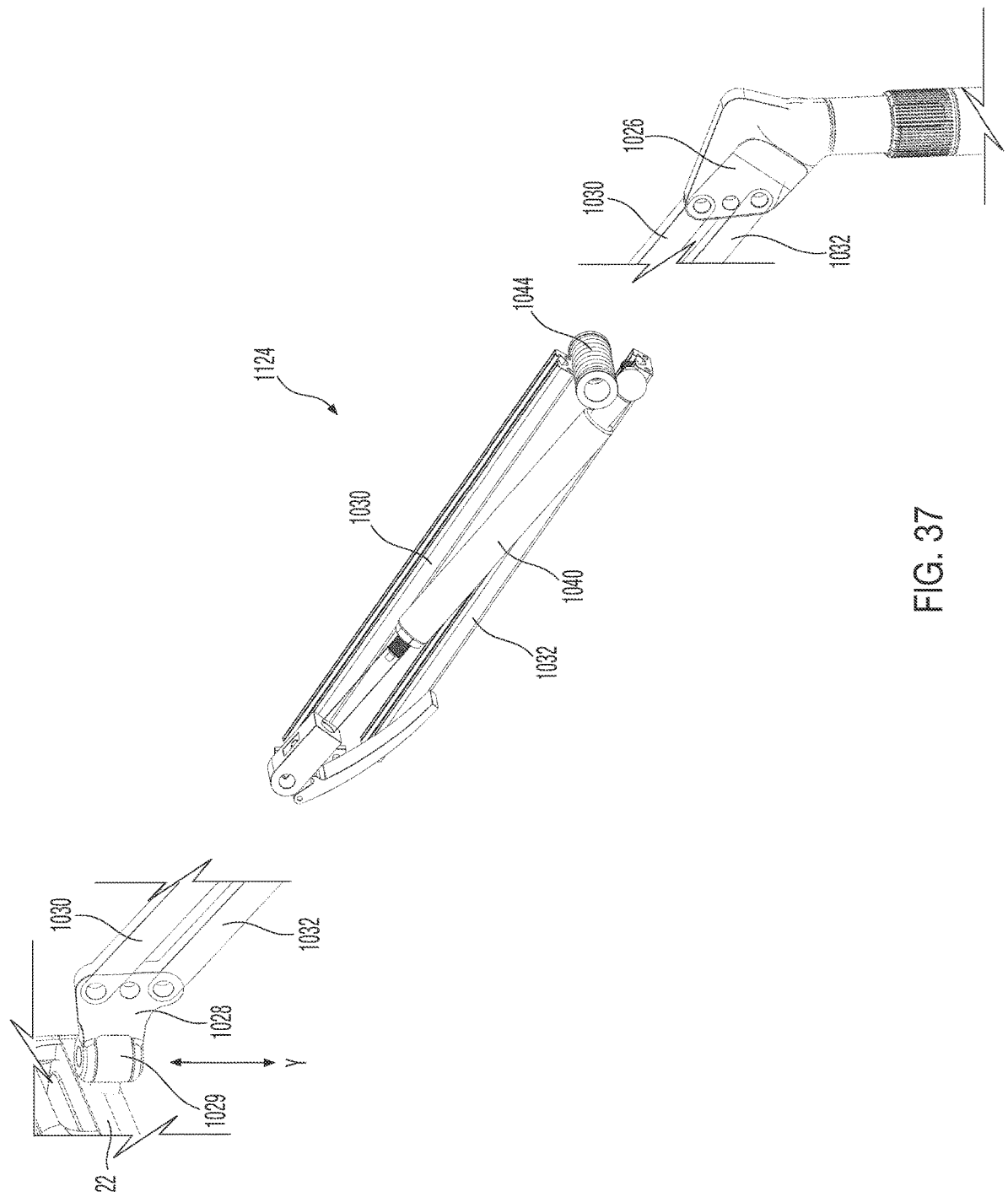
FIG. 37 is an exploded partial cutaway partially schematic perspective view showing a second mechanism for a main arm.
Figure 38:
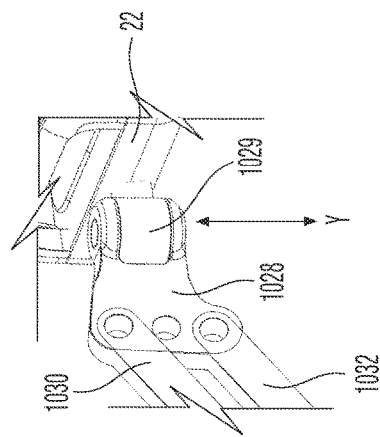
FIG. 38 is an exploded partial cutaway partially schematic perspective view showing a third mechanism for a main arm.
Figure 38:
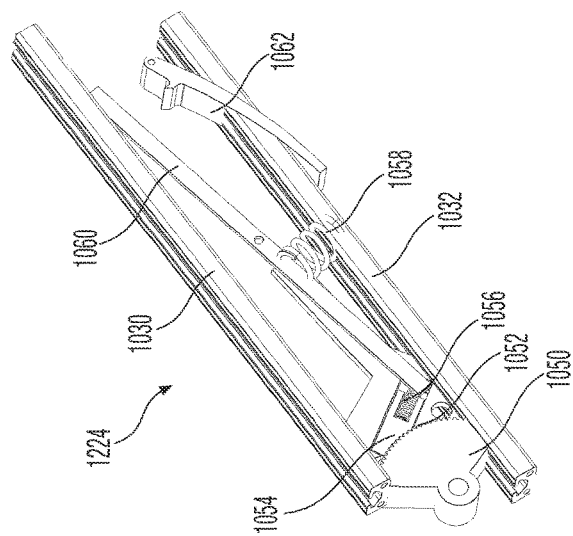
Figure 38:
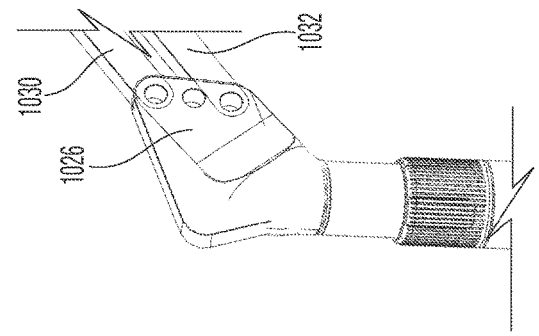

Referring to FIGS. 36-38, disclosed are various mechanisms for the main arm 24. Referring to FIG. 36, in one embodiment, a main-arm lockable mechanism 1024 may include a first main-arm end member 1026, a second main-arm end member 1028, an upper main-arm member 1030, and a lower main-arm member 1032, which together may form a four-bar linkage movable with respect to the first main-arm end member 1026 in a vertical plane, and which may be configured to maintain a pitch orientation of the device-receiving attachment 22 during such movement. The four-bar linkage may be selectively lockable to prevent movement thereof and may include a cam driver 1034 operatively attached to the upper main-arm member 1030 and the lower main-arm member 1032, with a multiplate clutch 1036 disposed to selectively engage and thereby permit or arrest movement of four-bar linkage with respect to the first main-arm end member 1026. The multiplate clutch 1036 may be operatively connected for release by a clutch-release handle 1038, which may be operatively attached to the trigger 25 (FIG. 1). Thus the main-arm lockable mechanism 1024 may provide for rotation of the main arm 24 in a vertical plane about the first main-arm end member 1026 without disturbing a user-selected pitch of the device-receiving attachment 22. The second main-arm end member 1028 may be operatively connected to a friction hinge 1029, which may be disposed at least generally vertically, to provide an adjustment with respect to the transverse device-support axis T, which may coincide with or be parallel to the axis of rotation of the vertical friction hinge 1029. The multiplate clutch 1036 may be configured so that, even when unlocked and movable, the multiplate clutch 1036 provides some resistance to movement to at least partially offset the weight of the device-receiving attachment 22 and any device carried thereon, so that when the four-bar linkage is unlocked, the main arm 24 remains at least partially supported and does not move rapidly downwardly, which could potentially damage the stand, device, support, or the like.

Referring to FIG. 37, in another embodiment, a main-arm lockable mechanism 1124 includes a first main-arm end member 1026, a second main-arm end member 1028, an upper main-arm member 1030, and a lower main-arm member 1032, which together form a four-bar linkage movable with respect to the first main-arm end member 1024 in a vertical plane and which may be configured to maintain a pitch orientation of the device-receiving attachment 22. The four-bar linkage may be selectively lockable to prevent movement thereof and may include a selectively lockable, remote-release gas spring 1040, releasable by a spring-release handle 1042 operatively attached to the upper main-arm member 1030 and the lower main-arm member 1032 and disposed to selectively engage and thereby permit or arrest movement of the four-bar linkage with respect to the first main-arm member 1024. The spring-release handle 1042 may be operatively attached to the trigger 25 (FIG. 1).

A compression spring 1044 may be provided and may be operatively attached to the main-arm lockable mechanism 1124 to bias the mechanism to at least partially offset the weight of the device-receiving attachment 22 and any device carried thereon, so that when the four-bar linkage is unlocked, the main arm 24 remains at least partially supported and does not move rapidly downwardly.

Referring to FIG. 38, in another embodiment, a main-arm lockable mechanism 1224 includes a first main-arm end member 1026, a second main-arm end member 1028, an upper main-arm member 1030, and a lower main-arm member 1032, which together form a four-bar linkage movable with respect to the first main-arm end member 1024 in a vertical plane and which may be configured to maintain a pitch orientation of the device-receiving attachment 22. The four-bar linkage may be selectively lockable to prevent movement thereof and may include a ratcheting mechanism with a toothed base 1050 operatively attached to at least one of the upper main-arm member 1030 and the lower main-arm member 1032, and to the first main-arm end member 1025. The toothed base 1050 has an array of teeth 1052. Operatively connected to the toothed base 1050 is a lockable pawl 1054, which is supported by a pawl-support link 1060 and is driven by a first spring 1056 and a second spring 1058 into engagement with the toothed base 1052. A ratchet-locking handle 1062 (which may be operatively attached to the trigger 25 (FIG. 1)) selectively locks the pawl-support link 1060, which in turn selectively locks the lockable pawl 1054 via engagement thereof with the teeth 1052 of the toothed base 1050, thereby preventing at least downward movement of the device-receiving attachment 22. The lockable pawl 1054 and the first and second springs 1056, 1058 may together provide some resistance to movement to at least partially offset the weight of the device-receiving attachment 22 and any device carried thereon, so that when the four-bar linkage is unlocked, the main arm 24 remains at least partially supported and does not move rapidly downwardly.

Figure 29A:
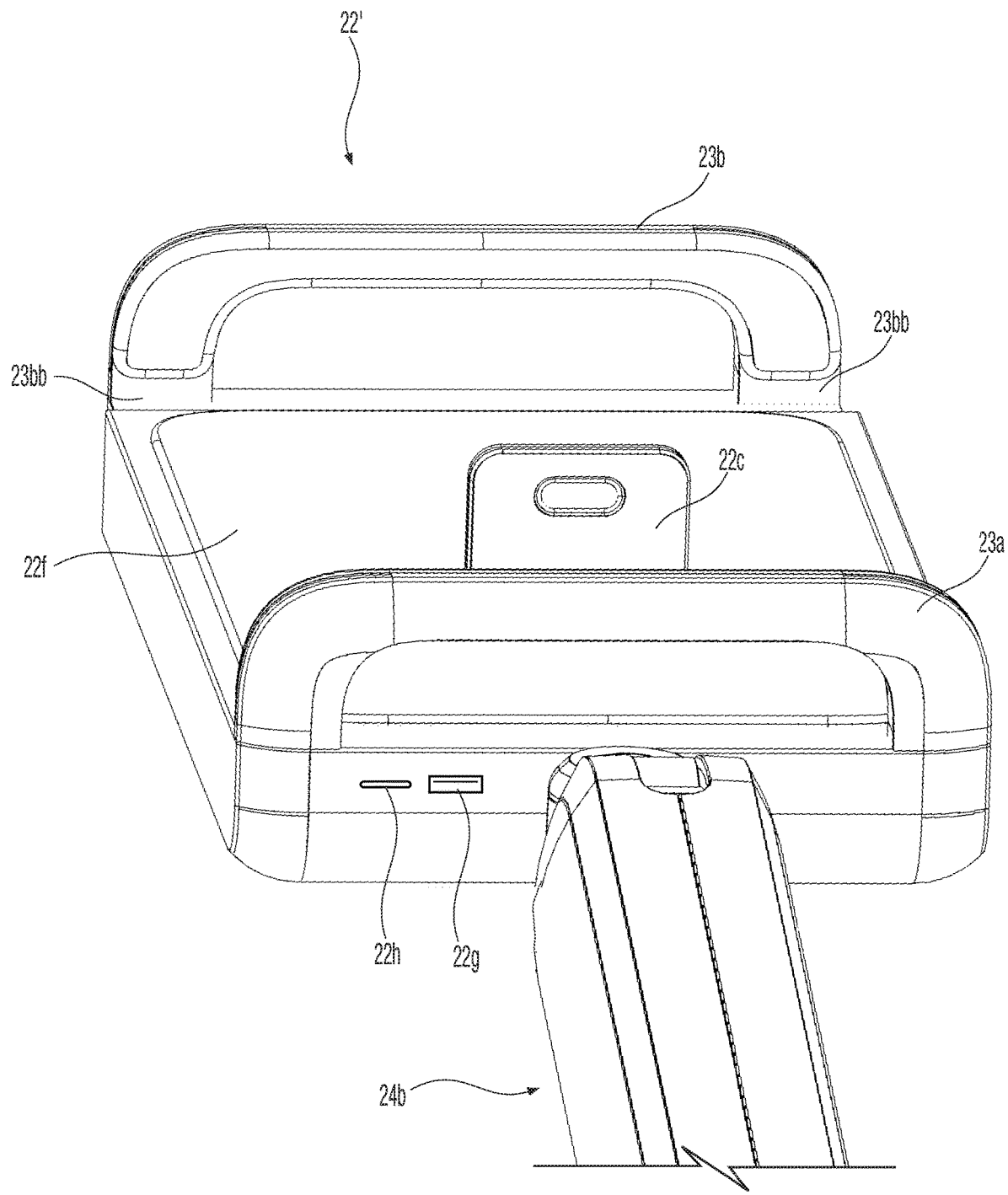
FIG. 29A is an enlarged partial front perspective view of the computing device stand of FIG. 29.
Figure 29B:
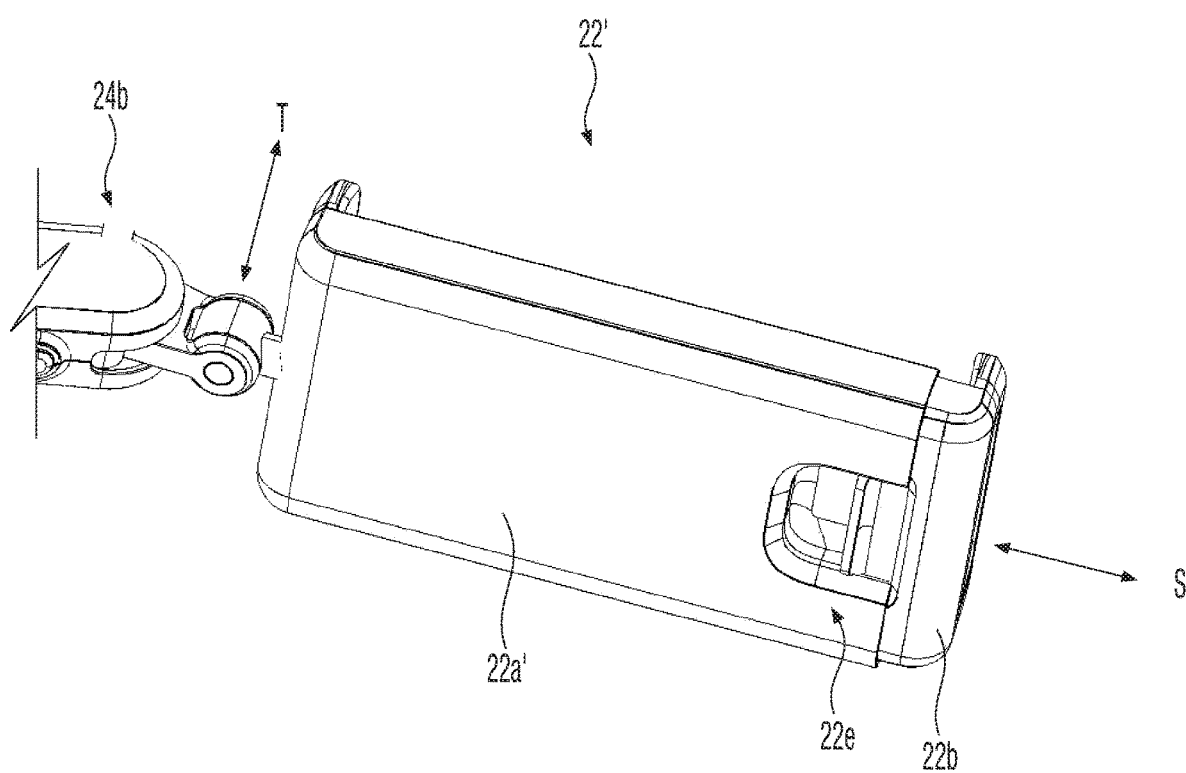
FIG. 29B is an enlarged partial lower perspective view of the computing device stand of FIG. 29.

In certain embodiments, the computing device stand 10, 10' may include a power cord for powering a laptop computer, a tablet computer, or other similar device having a viewing screen. The computing device stand may include clips for securing power cords, charging cords, or the like. The computing device stand, and in some embodiments the device-securing attachment, may include one or more mobile-device charging ports, such as a USB-charging port 22g or a USB-B charging port 22h as shown in FIG. 29A, connected to a suitable power supply as is known in the art. The computing device stand, and in some embodiments the device-securing attachment, may include a phone stand (not shown), a keyboard tray and/or mouse platform (not shown), a cup stand (not shown), a water-bottle stand (not shown), and lighting (not shown) such as LED lighting. A travel bag (not shown) may be provided for carrying any embodiment of the computing device stand.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present disclosure as defined by the appended claims. Moreover, aspects and features of various embodiments may be combined in a particular device; and fewer that all of the aspects and features of a particular embodiment disclosed herein may be sufficient for a functional embodiment.

We claim:

1. A clamp for engaging a clamped object, the clamp comprising:
   a first leg having a first end, a second end, and a central portion between the first end and the second end, wherein a first foot having a clamping surface is attached to the first end of the first leg, and a second foot having a clamping surface is attached to the second end of the first leg;
   a second leg having a first end, a second end, and a central portion located between the first end and the second end, wherein a third foot having a clamping surface is attached to the first end of the second leg, and a fourth foot having a clamping surface is attached to the second end of the second leg, and further wherein the first leg and the second leg are pivotally connected to each other about the central portions by a main shaft, with the first leg and the second leg being connected in a crosswise fashion such that the first end of the first leg and the first end of the second leg are located on a first side of a clamp dividing plane and the second end of the first leg and the second end of the second leg are located on a second side of the clamp dividing plane;
   a closing mechanism connected to the first leg and the second leg, the closing mechanism comprising:
      an anchor body having a threaded bore, wherein the threaded bore is oriented transversely with respect to the main shaft, and the anchor body is supported at a distance from the main shaft by a support frame;
      a threaded drive screw having a proximal end, a distal end opposite the proximal end, and a drive-screw axis extending through the proximal and distal ends, wherein the drive-screw axis is generally parallel to the clamp dividing plane;
      a drive body located in a distal direction from the anchor body, the drive body being supported for axial movement along the drive-screw axis and having a drive-screw landing for receiving the distal end of the drive screw;
      a first drive-body link having a first end pivotally attached to the drive body and a second end pivotally attached to the first leg at a first link joint radially spaced from the main shaft;
      a second drive-body link having a first end pivotally attached to the drive body and a second end pivotally attached to the second leg at a second link joint radially spaced from the main shaft;
      the drive body urging the first and second drive-body links at least partially distally, such that the first and second drive-body links urge the first ends of the first and second legs to pivot toward one another to provide a first clamping action between the first ends of the first and second legs, and the first and second drive-body links urge the second ends of the first and second legs to pivot toward one another to provide a second clamping action between the second ends of the first and second legs;
   the clamping surface of each of the first, second, third, and fourth feet being offset from the main shaft such that the clamping surfaces of the first, second, third, and fourth feet are configured to engage the clamped object which intersects the clamp dividing plane without the clamped object interfering with the main shaft or the first and second legs;
   the closing mechanism being configured so that upon a rotation of the drive screw in a first direction, the drive screw advances distally in the distal direction from the anchor body and reduces a distance between the distal end of the drive screw and the main shaft, thereby reducing a drive-body gap in which the drive body is movable between the distal end of the drive screw and the main shaft;

the closing mechanism being configured so that upon a rotation of the drive screw in a second direction, the drive screw translates proximally toward the anchor body and increases the distance between the distal end of the drive screw and the main shaft, thereby increasing the drive-body gap in which the drive body is movable between the distal end of the drive screw and the main shaft.

2. The clamp according to claim 1, wherein the support frame comprises a pair of spaced anchor plates extending radially outwardly with respect to the main shaft, wherein the first and second legs are pivotally connected with respect to the anchor plates, and further wherein the drive body is disposed between the first and second anchor legs in the distal direction from the anchor body.

3. The clamp according to claim 2, wherein the anchor plates are connected directly to the main shaft.

4. The clamp according to claim 1, further comprising a drive knob non-rotatably secured with respect to the drive screw.

5. The clamp according to claim 4, wherein the anchor body has a proximal portion with a knob bore telescopically engaging the drive knob.

6. The clamp according to claim 5, wherein the drive knob comprises a drive-knob nut non-rotatably secured to the proximal end of the drive screw and a drive-knob body with an internal socket non-rotatably engaging the drive-knob nut.

7. The clamp according to claim 1, wherein the support frame comprises a pair of spaced anchor plates, wherein the drive body comprises a pair of opposing rails externally engaging a pair of opposite surfaces of at least one of the anchor plates, and wherein the opposite surfaces of the at least one of the anchor plates extend in a direction generally parallel to the drive-screw axis.

8. The clamp according to claim 1, further comprising a drive-body pin extending at least partially parallel to the main shaft and engaging both the first end of the first drive-body link and the first end of the second drive-body link.

9. The clamp according to claim 8, wherein at least one anchor plate of the support frame includes an internal pin track engaging a side surface of the drive-body pin.

10. The clamp according to claim 1, further comprising a biasing member biasing the first and second legs to urge the first ends of the first and second legs toward one another and the second ends of the first and second legs toward one another.

11. The clamp according to claim 1, wherein at least one foot selected from the group of the first, second, third, and fourth feet comprises a foot assembly operatively secured in a foot mount in a corresponding one of the first end of the first leg, the first end of the second leg, the second end of the first leg, and the second end of the second leg, the foot assembly comprising:

a foot-assembly base having a base end, a free end, and a longitudinal axis defining a base direction and a free direction opposite the base direction, the base end being formed by a knob having a bore with internal threads and an opening at a free-direction end thereof, the knob having a radially outwardly extending external flange, the flange being operatively secured in the foot mount so that the knob is rotatable and axially constrained with respect to a foot-mounting hole of the foot mount; and an extension extending along an extension axis, the extension including the clamping surface of the at least one foot, with the clamping surface of the at least one foot being generally parallel to the extension axis, and the extension having an extension base end and an extension free end, the extension base end having a projection for engaging the internal threads of the knob such that a rotation of the knob in third direction causes the extension to extend with respect to the knob, and a rotation of the knob in a fourth direction causes the extension to retract with respect to the knob.

12. The clamp according to claim 11, wherein the extension has a gripping surface disposed non-colinearly with respect to the extension axis.

13. The clamp according to claim 12, wherein the foot assembly further comprises:

an orienting collar having:
 a disc comprising a slot extending longitudinally therethrough and a radially outwardly extending protrusion extending from an outer circumferential edge of the disc;
 a longitudinal protrusion extending from the disc in the base direction and configured to engage the extension to prevent the extension from rotating relative to the orienting collar;

wherein the foot mount comprises a radially outwardly extending recess extending from the foot-mounting hole and configured to accommodate the radially outwardly extending protrusion of the disc of the orienting collar, the radially outwardly extending recess being sized to allow for constrained movement of the radially outwardly extending protrusion therein, thus providing for constrained rotation of the orienting collar and the extension with respect to the foot-mounting hole.

14. The clamp according to claim 12, wherein the foot assembly further comprises:

an orienting collar comprising:
 a disc with a slot extending longitudinally therethrough and a flange extending radially outwardly from an outer circumferential edge of the disc, the flange defining a circumferential gap;
 a pair of longitudinal protrusions extending from the disc in the base direction on opposite sides of the slot and configured to engage the extension to prevent the extension from rotating relative to the orienting collar;

wherein the foot mount comprises a radially inwardly extending protrusion extending into the foot-mounting hole and configured to engage the circumferential gap, the circumferential gap and the radially inwardly extending protrusion being sized to allow for constrained movement of the radially inwardly extending protrusion within the circumferential gap, thus providing for constrained rotation of the orienting collar and the extension with respect to the foot-mounting hole.

15. The clamp according to claim 12, wherein the foot assembly further comprises:

an orienting collar comprising:
 a disc with a slot extending longitudinally therethrough and a radially outwardly extending protrusion extending from an outer circumferential edge of the disc; and
 a pair of longitudinal protrusions extending from the disc in the base direction on opposite sides of the slot and configured to engage the extension to prevent the extension from rotating relative to the orienting collar;

wherein the foot mount comprises a radially outwardly extending recess extending from the foot-mounting hole and configured to accommodate the radially outwardly extending protrusion of the disc of the orienting collar, the radially outwardly extending recess being sized to allow for constrained movement of the radially outwardly extending protrusion therein, thus providing for constrained rotation of the orienting collar and the extension with respect to the foot-mounting hole.

16. The clamp according to claim 11, wherein the clamping surface of the at least one foot has a clamping pad attached thereto.

17. A computing device stand, comprising:
a clamp for engaging a support member;
a base arm having a first base-arm portion connected to the clamp, and a second base-arm portion opposing the first base-arm portion;
a main arm having a first main-arm portion pivotally connected to the second base-arm portion, and a second main-arm portion opposing the first main-arm portion;
a device-receiving attachment operatively connected to the second main-arm portion, wherein the clamp comprises:
a first leg having a first end, a second end, and a central portion between the first end and the second end, wherein a first foot having a clamping surface is attached to the first end of the first leg, and further wherein a second foot having a clamping surface is attached to the second end of the first leg;
a second leg having a first end, a second end, and a central portion located between the first end and the second end, wherein a third foot having a clamping surface is attached to the first end of the second leg, and further wherein a fourth foot having a clamping surface is attached to the second end of the second leg, the first leg and the second leg being pivotally connected to each other about the central portions by a main shaft, with the first leg and the second leg being connected in a crosswise fashion such that the first end of the first leg and the first end of the second leg are located on a first side of a clamp dividing plane and the second end of the first leg and the second end of the second leg are located on a second side of the clamp dividing plane;
a closing mechanism connected to the first leg and the second leg, the closing mechanism comprising:
an anchor body having a threaded bore, wherein the threaded bore is oriented transversely with respect to the main shaft, and the anchor body is supported at a distance from the main shaft by a support frame;
a threaded drive screw having a proximal end, a distal end opposite the proximal end, and a drive-screw axis extending through the proximal and distal ends, wherein the drive-screw axis is generally parallel to the clamp dividing plane;
a drive body located in a distal direction from the anchor body and between a pair of spaced anchor plates of the support frame, the drive body being supported for axial movement along the drive-screw axis and having a drive-screw landing for receiving the distal end of the drive screw;
a first drive-body link having a first end pivotally attached to the drive body and a second end pivotally attached to the first leg at a first link joint radially spaced from the main shaft;
a second drive-body link having a first end pivotally attached to the drive body and a second end pivotally attached to the second leg at a second link joint radially spaced from the main shaft;
the drive body urging the first and second drive-body links at least partially distally, such that the first and second drive-body links urge the first ends of the first and second legs to pivot toward one another to provide a first clamping action between the first ends of the first and second legs, and the first and second drive-body links urge the second ends of the first and second legs to pivot toward one another to provide a second clamping action between the second ends of the first and second legs;
the clamping surface of each of the first, second, third, and fourth feet being offset from the main shaft such that the clamping surfaces of the first, second, third, and fourth feet are configured to engage the support member which intersects the clamp dividing plane without the support member interfering with the main shaft;
the closing mechanism being configured so that upon a rotation of the drive screw in a first direction, the drive screw advances distally in the distal direction from the anchor body and reduces a distance between the distal end of the drive screw and the main shaft, reducing a drive-body gap in which the drive body is movable between the distal end of the drive screw and the main shaft;
the closing mechanism being configured so that upon a rotation of the drive screw in a second direction, the drive screw translates proximally toward the anchor body and increases the distance between the distal end of the drive screw and the main shaft, increasing the drive-body gap in which the drive body is movable between the distal end of the drive screw and the main shaft.

18. The computing device stand of claim 17, wherein the first base-arm portion is oriented at least partially parallel to the drive-screw axis.

19. The computing device stand according to claim 17, wherein at least one foot selected from the group of the first, second, third, and fourth feet comprises a foot assembly operatively secured in a foot mount in a corresponding one of the first end of the first leg, the first end of the second leg, the second end of the first leg, and the second end of the second leg, the foot assembly comprising:
a foot-assembly base having a base end, a free end, and a longitudinal axis defining a base direction and a free direction opposite the base direction, the base end being formed by a knob having a bore with internal threads and an opening at a free-direction end thereof, the knob having a radially outwardly extending external flange, the flange being operatively secured in the foot mount so that the knob is rotatable and axially constrained with respect to a foot-mounting hole of the foot mount; and
an extension extending along an extension axis, the extension including the clamping surface of the at least one foot, with the clamping surface of the at least one foot being generally parallel to the extension axis, and the extension having an extension base end and an extension free end, the extension base end having a projection for engaging the internal threads of the knob such that a rotation of the knob in a third direction causes the extension to extend with respect to the knob, and a rotation of the knob in a fourth direction causes the extension to retract with respect to the knob.

20. The computing device stand of claim 17, wherein the base arm comprises a first telescoping body and a second telescoping body telescopically and securably received with respect to the first telescoping body to provide a length adjustment of the base arm.

21. The computing device stand of claim 20, wherein the first main-arm portion of the main arm is mounted for rotation with the second telescoping body with respect to the first telescoping body.

22. The computing device stand of claim 17, wherein the main arm comprises a first main-arm end member, a second main-arm end member, an upper main-arm member, and a lower main-arm member, wherein the first main-arm end member, the second main-arm end member, the upper main-arm member, and the lower main-arm member form a four-bar linkage movable with respect to the first main-arm end member in a vertical plane while maintaining an orientation of the second main-arm end member with respect to vertical.

23. The computing device stand of claim 22, wherein the four-bar linkage is selectively lockable to prevent movement thereof.

24. The computing device stand of claim 17, wherein the device-receiving attachment has a device-support surface and a principal device-support axis parallel thereto, and wherein the device-receiving attachment is operatively connected to the second main-arm portion and is rotatable with respect to the second main-arm portion for a pitch adjustment of the device-receiving attachment about the principal device-support axis.

25. The computing device stand of claim 24, wherein the device-receiving attachment has a transverse device-support axis oriented transversely with respect to both the principal device-support axis and the device-support surface, and wherein the device-receiving attachment is operatively connected to the second main-arm portion and is rotatable with respect to the second main-arm portion for a yaw adjustment of the device-receiving attachment about the transverse device-support axis.

26. The computing device stand of claim 17, wherein the device-receiving attachment includes a device-support surface, a principal device-support axis, and a transverse device-support axis oriented transversely with respect to both the principal device-support axis and the device-support surface, and wherein the device-receiving attachment is operatively connected to the second main-arm portion and is rotatable with respect to the second main-arm portion for a yaw adjustment of the device-receiving attachment about the transverse device-support axis.

27. The computing device stand of claim 26, wherein the device-receiving attachment is operatively connected to the second main-arm portion by a friction hinge.

28. The computing device stand of claim 17, wherein the device-receiving attachment has a device-support surface, a first rail transverse to the device-support surface, and a second rail transverse to the device-support surface, the second rail being slidably and securably attached with respect to the first rail.

29. The computing device stand of claim 28, wherein the first rail has a first device-contact surface and the second rail has a second device-contact surface facing the first device-contact surface, and wherein the device-support surface comprises a tab positionable in a support position in which a tab-device support surface of the tab faces one of the first device-contact surface and the second device-contact surface for securing a first device between the tab-device support surface and the one of the first device-contact surface and the second device-contact surface, and a non-support position in which the tab does not protrude from the device-support surface sufficiently to interfere with securing a second device between the first device-contact surface and the second device-contact surface.

30. The computing device stand of claim 17, wherein the main arm is rotatable about the base arm to a stowed main-arm position in which the base arm extends from the clamp in a third direction, the main arm extends from the base arm in a fourth direction, and the fourth direction is generally opposite the third direction.

\* \* \* \* \*